US010591917B2

(12) United States Patent
Kadono et al.

(10) Patent No.: US 10,591,917 B2
(45) Date of Patent: *Mar. 17, 2020

(54) WORK MACHINE MANAGEMENT APPARATUS

(71) Applicant: Komatsu Ltd., Tokyo (JP)

(72) Inventors: Yosuke Kadono, Hiratsuka (JP); Takashi Hiranaka, Hiratsuka (JP); Isao Toku, Hiratsuka (JP); Kenta Osagawa, Fujisawa (JP); Takashi Yamamoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,459

(22) Filed: Sep. 28, 2018

(65) Prior Publication Data

US 2019/0033873 A1    Jan. 31, 2019

Related U.S. Application Data

(62) Division of application No. 15/325,132, filed as application No. PCT/JP2016/063511 on Apr. 28, 2016, now Pat. No. 10,108,196.

(51) Int. Cl.
*G05D 1/02* (2006.01)
*E02F 9/20* (2006.01)
(Continued)

(52) U.S. Cl.
CPC ........... *G05D 1/0212* (2013.01); *E02F 9/205* (2013.01); *E02F 9/2054* (2013.01); *E02F 9/262* (2013.01);
(Continued)

(58) Field of Classification Search
CPC ......... E02F 9/205; E02F 9/2054; E02F 9/262; G05D 1/0088; G05D 1/0212;
(Continued)

(56) References Cited

U.S. PATENT DOCUMENTS 5,938,707 A     8/1999   Uehara
6,393,362 B1    5/2002   Burns
(Continued)

FOREIGN PATENT DOCUMENTS

CN     101379368 A     3/2009
CN     10275704 A      10/2012
(Continued)

OTHER PUBLICATIONS

International Search Report dated Jul. 26, 2016, issued for PCT/JP2016/063511.
(Continued)

*Primary Examiner* — Tyler J Lee
(74) *Attorney, Agent, or Firm* — Locke Lord LLP

(57) ABSTRACT

A work machine management apparatus includes: a switchback point setting unit configured to set a plurality of switchback points of a work machine in a work place of a mine; a work point setting unit configured to set at least one work point of the work machine in the work place; a travel track generating unit configured to generate a plurality of target travel tracks along which the work machine travels in the work place based on a position of the at least one work point and a position of each of the plurality of switchback points; and a travel track selecting unit configured to select, among the plurality of target travel tracks, a target travel track along which the work machine travels in the work place.

12 Claims, 16 Drawing Sheets

(51) Int. Cl.
*E02F 9/26* (2006.01)
*G05D 1/00* (2006.01)

(52) U.S. Cl.
CPC ......... *G05D 1/0088* (2013.01); *G05D 1/0285* (2013.01); *G05D 1/0287* (2013.01); *G05D 1/0297* (2013.01); *G05D 2201/021* (2013.01); *G05D 2201/0202* (2013.01)

(58) Field of Classification Search
CPC .. G05D 1/0285; G05D 1/0287; G05D 1/0297; G05D 2201/0202; G05D 2201/021
See application file for complete search history.

(56) References Cited

U.S. PATENT DOCUMENTS

| | | | |
|---|---|---|---|
| 6,502,016 B1 | 12/2002 | Ozaki et al. | |
| 7,991,521 B2 | 8/2011 | Stewart | |
| 8,965,622 B2 | 2/2015 | Ozaki et al. | |
| 9,341,480 B2 | 5/2016 | Sugihara et al. | |
| 9,383,754 B2 | 7/2016 | Takeda | |
| 9,568,322 B2 | 2/2017 | Sugihara et al. | |
| 9,760,080 B2 | 9/2017 | Sugihara et al. | |
| 10,025,313 B2 | 7/2018 | Tojima et al. | |
| 10,311,526 B2 | 6/2019 | Takeda | |
| 10,373,274 B2 | 8/2019 | Takeda | |
| 2005/0197175 A1 | 9/2005 | Anderson | |
| 2007/0150133 A1 | 6/2007 | Sudou et al. | |
| 2007/0179690 A1 | 8/2007 | Stewart | |
| 2010/0076640 A1 | 3/2010 | Maekawa et al. | |
| 2012/0296495 A1 | 11/2012 | Ozaki et al. | |
| 2013/0211712 A1 | 8/2013 | Takeda | |
| 2013/0325208 A1 | 12/2013 | Osagawa et al. | |
| 2014/0231153 A1* | 8/2014 | Fukasu | E02F 9/26 177/25.13 |
| 2015/0066352 A1 | 3/2015 | Sugihara et al. | |
| 2015/0134184 A1 | 5/2015 | Takeda | |
| 2015/0178859 A1 | 6/2015 | Takeda | |
| 2015/0233716 A1 | 8/2015 | Sugihara et al. | |
| 2015/0253776 A1 | 9/2015 | Tojima et al. | |
| 2015/0269685 A1 | 9/2015 | Takeda | |
| 2016/0224026 A1 | 8/2016 | Hamada et al. | |
| 2016/0274562 A1 | 9/2016 | Sugihara et al. | |

FOREIGN PATENT DOCUMENTS

| | | |
|---|---|---|
| CN | 104541217 A | 4/2015 |
| CN | 104541299 A | 4/2015 |
| CN | 104603819 A | 5/2015 |
| CN | 104603821 A | 5/2015 |
| CN | 104641393 A | 5/2015 |
| CN | 104769630 A | 7/2015 |
| CN | 105210102 A | 12/2015 |
| EP | 3104244 A1 | 12/2016 |
| JP | 09-062346 A | 3/1997 |
| JP | 11-283176 A | 10/1999 |
| JP | 2003-265663 A | 9/2003 |
| JP | 2009-059192 A | 3/2009 |
| JP | 2009-525553 A | 7/2009 |
| JP | 2012-022611 A | 2/2012 |
| JP | 2012-113429 A | 6/2012 |
| JP | 2014-142831 A | 8/2014 |
| WO | WO-2011/090093 A1 | 7/2011 |
| WO | WO-2015/087430 A1 | 6/2015 |
| WO | WO-2015/119266 A1 | 8/2015 |
| WO | WO-2016/051526 A1 | 4/2016 |

OTHER PUBLICATIONS

Office Action dated Mar. 1, 2017, issued for the corresponding Australian patent application No. 2016248872.

* cited by examiner

WORK MACHINE MANAGEMENT APPARATUS

FIELD

The present invention relates to a work machine management apparatus.

BACKGROUND

In a mine, there is a case in which a work machine operated without the help of a man is used. Patent Literature 1 discloses an example of an unmanned vehicle traveling system that causes an unmanned dump truck to travel.

CITATION LIST

Patent Literature

Patent Literature 1: WO 2011/090093 A

SUMMARY

Technical Problem

In the unmanned vehicle traveling system, the work machine travels in accordance with target travel track data representing a target travel track and sent from a management apparatus. A plurality of work machines travel along the same target travel track. For that reason, there is a high possibility that a rut is generated in a transportation track or a work place in a mine. When a deep rut is generated, the traveling of the work machine is disturbed. Therefore, when the deep rut is generated, for example, a ground leveling work using a grader is performed. During the ground leveling work, the traveling of the work machine is disturbed and hence the productivity of the mine is deteriorated. Further, the ground leveling work causes an increase in cost.

An aspect of the present invention is to provide a work machine management apparatus capable of suppressing deterioration in productivity in a mine by suppressing the generation of a rut.

Solution to Problem

According to an aspect of the present invention, a work machine management apparatus comprises: a switchback point setting unit configured to set a plurality of switchback points of a work machine in a work place of a mine; a work point setting unit configured to set at least one work point of the work machine in the work place; a travel track generating unit configured to generate a plurality of target travel tracks along which the work machine travels in the work place based on a position of the at least one work point and a position of each of the plurality of switchback points; and a travel track selecting unit configured to select, among the plurality of target travel tracks, a target travel track along which the work machine travels in the work place.

Advantageous Effects of Invention

According to the aspect of the present invention, there is provided a work machine management apparatus capable of suppressing deterioration in productivity in a mine by suppressing the generation of a rut.

DESCRIPTION OF EMBODIMENTS

Hereinafter, embodiments according to the present invention will be described with reference to the drawings, but the present invention is not limited thereto.

<First Embodiment>

Figure 1:
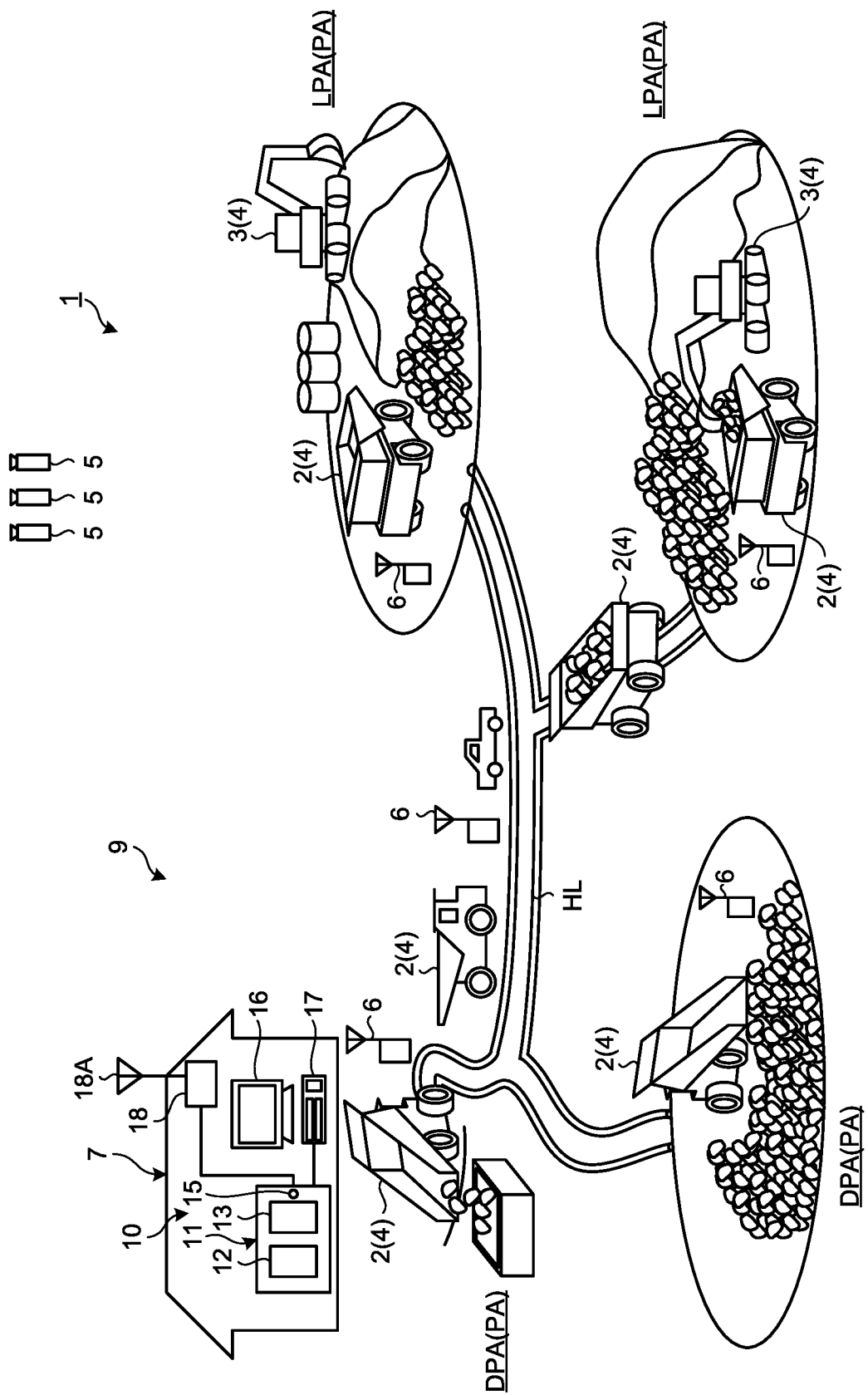
FIG. 1 is a diagram schematically illustrating an example of a work machine control system according to a first embodiment.

A first embodiment will be described. FIG. 1 is a diagram illustrating an example of a control system 1 of a work machine 4 according to the embodiment. In the embodiment, an example will be described in which the work machine 4 is a mining machine 4 operated in a mine.

The mining machine 4 generally indicates a machine which is used for various kinds of work in a mine. The mining machine 4 includes at least one of a transporting machine, a loading machine, an excavating machine, a boring machine, and a crushing machine. The transporting machine is a mining machine used to transport a load and includes a dump truck with a vessel. The loading machine is a mining machine used to load a load onto the transporting machine and includes at least one of an excavator, an electric excavator, and a wheel loader.

Further, the mining machine 4 includes an unmanned mining machine operated without the help of a man and a manned mining machine operated by the operation of an operator riding thereon.

In the embodiment, an example will be described in which a dump truck 2 as the transporting machine and an excavator 3 as the loading machine are operated as the mining machine 4.

In the embodiment, the dump truck 2 is an unmanned dump truck operated without the help of a man. The dump truck 2 travels autonomously in a mine based on data or signals sent from a management apparatus 10. The autonomous traveling of the dump truck 2 indicates the traveling based on the data or signals sent from the management apparatus 10 instead of the operation of the operator.

In the embodiment, the excavator 3 is a manned excavator which is operated by an operator riding thereon.

As illustrated in FIG. 1, a work place PA and a transportation track HL are provided in a mine. The work place PA includes at least one of a loading place LPA and a soil removing place DPA. The loading place LPA is an area in which a loading operation of loading a load onto the dump truck 2 is performed. The soil removing place DPA is an area in which a discharging operation of discharging a load from the dump truck 2 is performed. The transportation track HL is a travel track that leads to the work place PL. The dump truck 2 travels along at least part of the work place PA and the transportation track HL of the mine.

In FIG. 1, the control system 1 includes a communication system 9 and the management apparatus 10 provided in a mine control facility 7. The communication system 9 includes a plurality of relays 6 which relay data or signals. The communication system 9 sends and receives data or signals between the management apparatus 10 and the mining machine 4 based on radio communication. Further, the communication system 9 sends and receives data or signals among the plurality of mining machines 4 based on radio communication.

In the embodiment, the position of the mining machine 4 including the dump truck 2 and the excavator 3 is detected by a GNSS (Global Navigation Satellite System). The GNSS indicates a global navigation satellite system. As an example of the global navigation satellite system, a GPS (Global Positioning System) can be exemplified. The GNSS includes a plurality of positioning satellites 5. The GNSS detects a position specified by the coordinate data of latitude, longitude, and altitude. The position detected by the GNSS is an absolute position specified by a global coordinate system. By the use of the GNSS, the position of the dump truck 2 and the position of the excavator 3 in the mine are detected.

In the description below, the position detected by the GNSS will be appropriately referred to as a GPS position. The GPS position is an absolute position and includes coordinate data of latitude, longitude, and altitude.

Next, the management apparatus 10 will be described. The management apparatus 10 sends data or signals to the mining machine 4 and receives data or signals from the mining machine 4. As illustrated in FIG. 1, the management apparatus 10 includes a computer 11, a display device 16, an input device 17, and a radio communication device 18.

The computer 11 includes a processing device 12, a storage device 13 connected to the processing device 12, and an input/output unit 15. The display device 16, the input device 17, and the radio communication device 18 are connected to the computer 11 through the input/output unit 15.

The processing device 12 performs a calculation process for managing the mining machine 4. The processing device 12 includes a processor such as a CPU (Central Processing Unit). The storage device 13 stores data for managing the mining machine 4. The storage device 13 includes non-volatile memory such as ROM (Read Only Memory) or flash memory and volatile memory such as RAM (Random Access Memory). The display device 16 displays the result of a calculation process of the processing device 12. The display device 16 includes a flat panel display such as a liquid crystal display (LCD) or an organic electro luminescence display (OELD). The input device 17 generates data for managing the mining machine 4 through an operation. The input device 17 includes at least one of, for example, a keyboard, a mouse, and a touch panel for a computer. The processing device 12 performs a calculation process by the use of at least one of data stored in the storage device 13, data generated by the input device 17, and data acquired through the communication system 9.

The radio communication device 18 is provided in the control facility 7. The radio communication device 18 includes an antenna 18A. The radio communication device 18 is connected to the processing device 12 through the input/output unit 15. The communication system 9 includes the radio communication device 18. The radio communication device 18 can receive data or signals sent from the mining machine 4. The data or signals received by the radio communication device 18 are output to the processing device 12 and are stored in the storage device 13. The radio communication device 18 can send data or signals to the mining machine 4.

Figure 2:
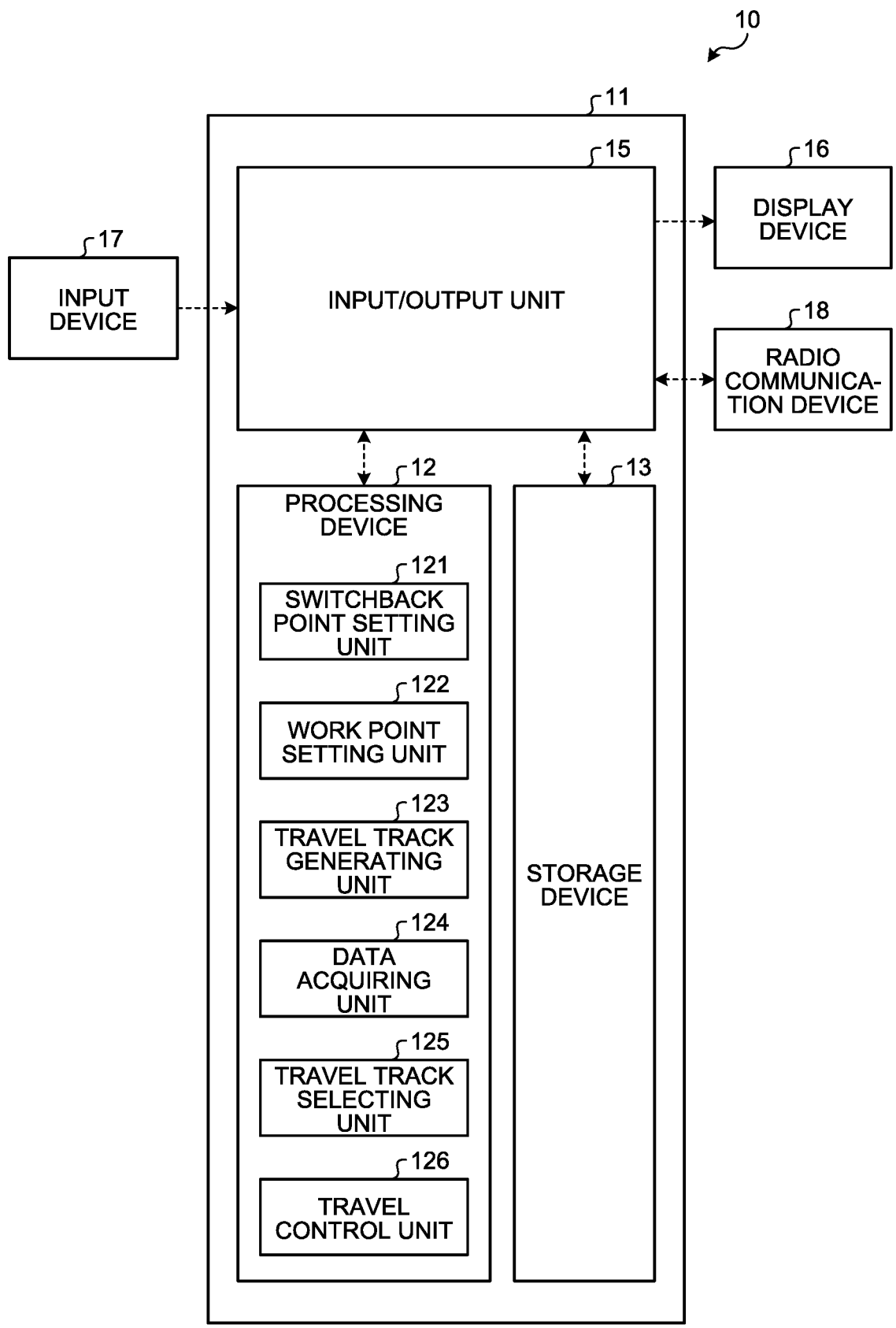
FIG. 2 is a functional block diagram illustrating an example of a management apparatus according to the first embodiment.

FIG. 2 is a functional block diagram illustrating an example of the management apparatus 10 according to the embodiment. As illustrated in FIG. 2, the processing device 12 of the management apparatus 10 includes a switchback point setting unit 121 which sets a switchback point of the dump truck 2 in the work place PA of the mine, a work point setting unit 122 which sets a work point of the dump truck 2 in the work place PA of the mine, a travel track generating unit 123 which generates a plurality of target travel tracks of the mining machine 4, a data acquiring unit 124 which acquires data or signals sent from the mining machine 4, a travel track selecting unit 125 which selects a target travel track for the dump truck 2 among the plurality of target travel tracks generated by the travel track generating unit 123, and a travel control unit 126 which outputs a control signal so that the dump truck 2 travels along the target travel track selected by the travel track selecting unit 125.

The switchback point setting unit 121 sets a switchback point representing an absolute position in which the dump truck 2 is switched back in at least one of the loading place LPA and the soil removing place DPA. The switchback point setting unit 121 sets a plurality of switchback points of the dump truck 2 in the work place including at least one of the loading place LPA and the soil removing place DPA in the mine. The switching back indicates an operation in which the forward moving dump truck 2 changes the traveling direction at a sharp angle and approaches a work point while moving backward.

The work point setting unit 122 sets a work point representing an absolute position in which the dump truck 2 performs a specific work in at least one of the loading place LPA and the soil removing place DPA. The specific work of the dump truck 2 includes at least one of a loading operation of loading a load onto the dump truck 2 and a discharging operation of discharging a load from the dump truck 2. The work point includes at least one of a loading point representing an absolute position in which a loading operation is performed and a discharging point representing an absolute position in which a discharging operation is performed. The loading point is set in the loading place LPA. The discharging point is set in the soil removing place DPA.

The travel track generating unit 123 generates a target travel track for each dump truck 2 traveling in at least one of the transportation track HL and the work place PA of the mine. The travel track generating unit 123 generates a plurality of target travel tracks along which the dump truck 2 travels to the work place based on the position of at least one work point and each position of the plurality of switchback points set by the switchback point setting unit 121.

The data acquiring unit 124 acquires data or signals sent from the mining machine 4 including the dump truck 2 and the excavator 3.

The travel track selecting unit 125 selects a target travel track for each of the plurality of dump trucks 2 in the work place among the plurality of target travel tracks generated by the travel track generating unit 123. The travel track selecting unit 125 selects the target travel track to suppress the generation of a rut in the work place. Further, when a plurality of switchback points are set, the travel track selecting unit 125 selects the target travel track so that a first dump truck 2 travels to the work point through a first switchback point and a second dump truck 2 travels to the work point through a second switchback point.

The travel control unit 126 generates a control signal for controlling the traveling of the dump truck 2 and outputs the control signal. The travel control unit 126 controls the dump truck 2 so that the dump truck 2 travels along the target travel track generated by the travel track generating unit 123.

Figure 3:
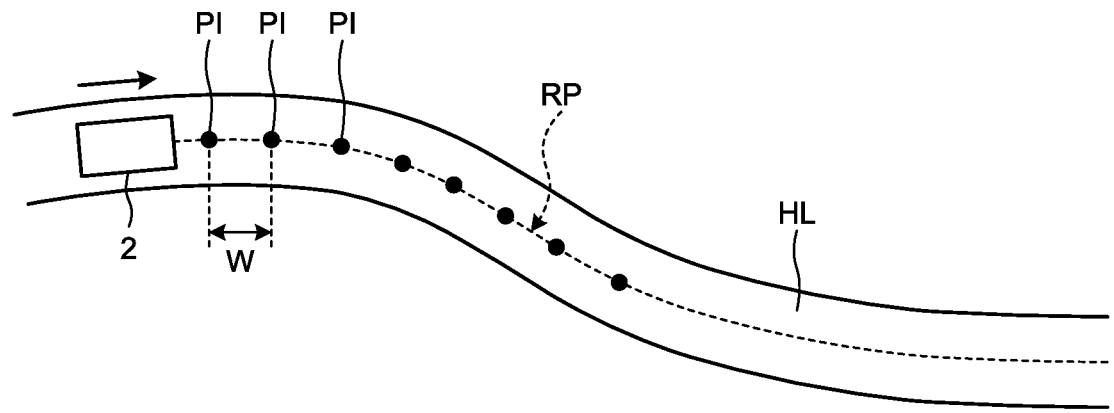
FIG. 3 is a schematic diagram illustrating an example of a target travel track according to the first embodiment.

FIG. 3 is a schematic diagram illustrating an example of a target travel track RP according to the embodiment. The travel track generating unit 123 of the processing device 12 generates the traveling condition data of the dump truck 2 traveling in the mine. The traveling condition data of the target travel track RP includes an assembly of a plurality of course points PI set on the target travel track RP at the same interval W.

Each of the plurality of course points PI includes target absolute position data of the dump truck 2 and target travel speed data of the dump truck 2 at a position in which the course point PI is set. The target travel track RP is specified by the target travel track RP as the assembly of the plurality of course points PI. The target travel track RP of the dump truck 2 is specified by a track passing through the plurality of course points PI. Based on the target travel speed data, a target travel speed of the dump truck 2 at a position in which the course point PI is set is specified.

The management apparatus 10 outputs traveling condition data including the plurality of front course points PI in the traveling direction to the dump truck 2 through the radio communication device 18. The dump truck 2 travels in the mine in accordance with the traveling condition data sent from the management apparatus 10.

Additionally, FIG. 3 illustrates the target travel track RP set in the transportation track HL. The travel track generating unit 123 generates the target travel track RP representing the target travel track RP not only in the transportation track HL, but also in the work place PA.

Figure 4:
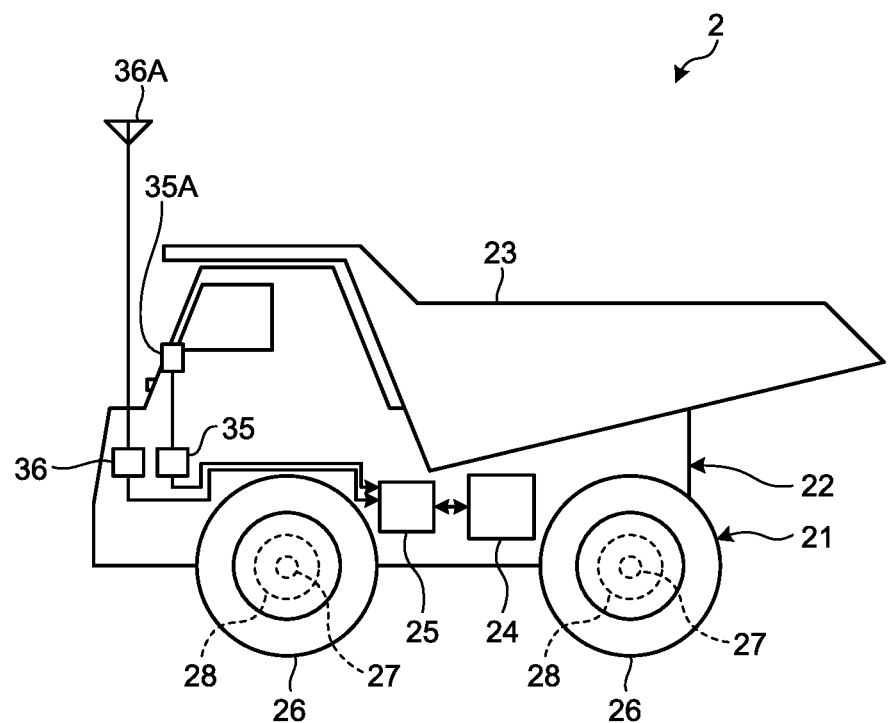
FIG. 4 is a diagram schematically illustrating an example of a dump truck according to the first embodiment.

Next, the dump truck 2 according to the embodiment will be described. FIG. 4 is a diagram schematically illustrating an example of the dump truck 2 according to the embodiment.

The dump truck 2 includes a traveling device 21 which travels in the mine, a vehicle body 22 which is supported by the traveling device 21, a vessel 23 which is supported by the vehicle body 22, a driving device 24 which drives the traveling device 21, and a control device 25.

The traveling device 21 includes a vehicle wheel 26, an axle 27 which rotatably supports the vehicle wheel 26, a brake device 28 which brakes the traveling device 21, and a steering device 29 which can adjust a traveling direction.

The traveling device 21 is operated by driving power generated by the driving device 24. The driving device 24 generates driving power for accelerating the dump truck 2. The driving device 24 drives the traveling device 21 by, for example, an electric driving method. The driving device 24 includes an internal combustion engine such as a diesel engine, a generator generated by power of the internal combustion engine, and a motor operated by electric power generated by the generator.

The steering device 29 adjusts the advancing direction of the dump truck 2 by changing the direction of the vehicle wheel 26.

The brake device 28 generates a braking force for decelerating or stopping the dump truck 2. The control device 25 outputs an accelerator instruction signal for operating the driving device 24, a brake instruction signal for operating the brake device 28, and a steering instruction signal for operating the steering device 29.

Further, the dump truck 2 includes a position detector 35 which detects the position of the dump truck 2 and a radio communication device 36.

The position detector 35 includes a GPS receiver and detects the GPS position (coordinate) of the dump truck 2. The position detector 35 includes a GPS antenna 35A. The antenna 35A receives radio waves from the positioning satellite 5. The position detector 35 converts signals based on the radio waves sent from the positioning satellite 5 and received by the antenna 35A into electric signals and calculates the position of the antenna 35A. When the GPS position of the antenna 35A is calculated, the GPS position of the dump truck 2 is detected.

The communication system 9 includes the radio communication device 36 provided in the dump truck 2. The radio communication device 36 includes an antenna 36A. The radio communication device 36 can perform radio communication with respect to the management apparatus 10.

The management apparatus 10 sends the traveling condition data of the dump truck 2 including the target travel track RP to the control device 25 through the communication system 9. The control device 25 controls at least one of the dump truck 2 the driving device 24, the brake device 28, and the steering device 29 so that the dump truck 2 travels in accordance with the traveling condition data based on the traveling condition data supplied from the management apparatus 10.

Further, the dump truck 2 sends absolute position data representing the absolute position of the dump truck 2 detected by the position detector 35 to the management apparatus 10 through the communication system 9. The data acquiring unit 124 of the management apparatus 10 acquires the absolute position data of the plurality of dump trucks 2 traveling in the mine.

Figure 5:
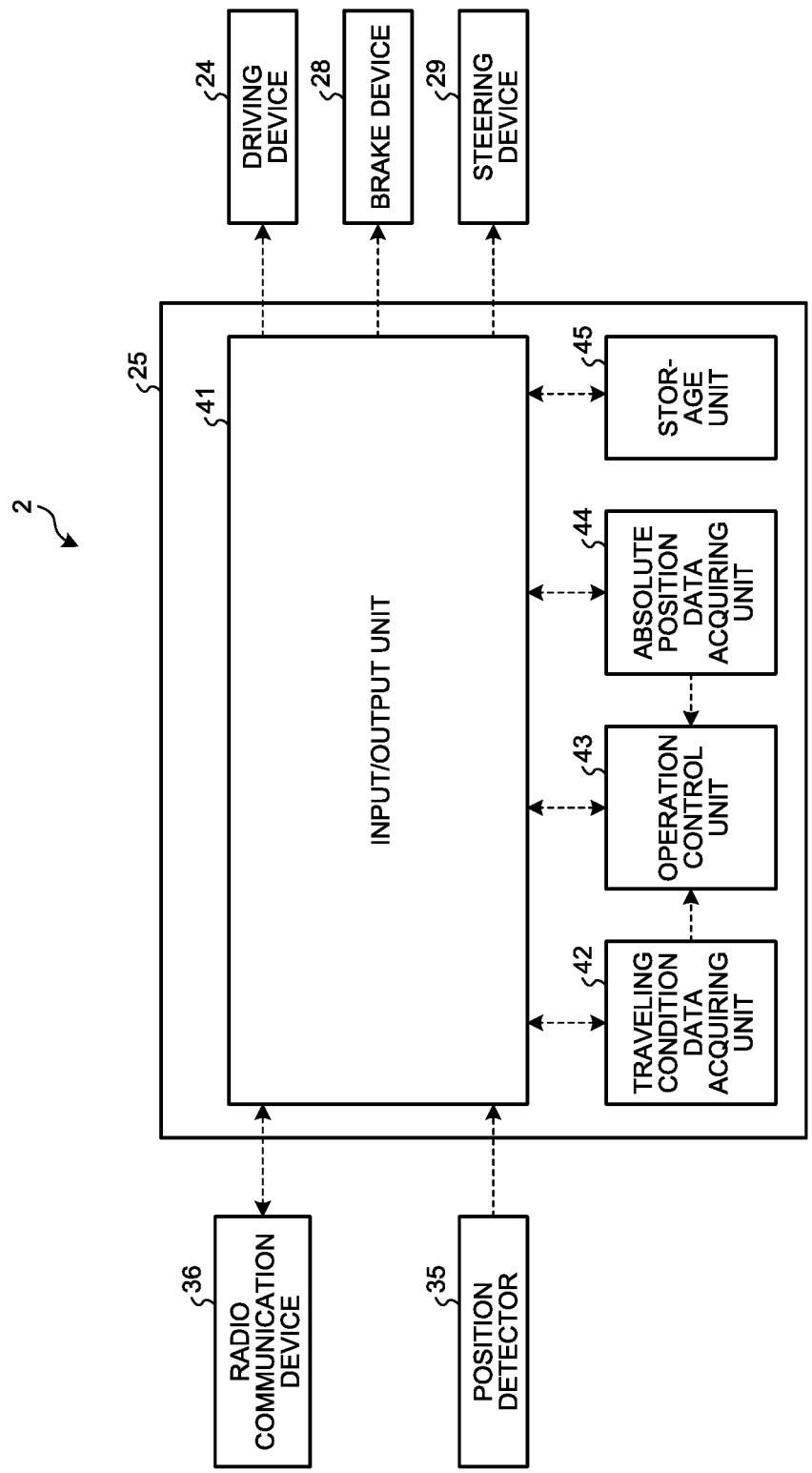
FIG. 5 is a functional block diagram illustrating an example of a dump truck control device according to the first embodiment.

Next, the control device 25 of the dump truck 2 according to the embodiment will be described. FIG. 5 is a functional block diagram of the control device 25 of the dump truck 2 according to the embodiment. The control device 25 is mounted on the dump truck 2.

As illustrated in FIG. 5, the dump truck 2 includes the radio communication device 36, the position detector 35, the control device 25, the driving device 24, the brake device 28, and the steering device 29.

The control device 25 includes an input/output unit 41, a traveling condition data acquiring unit 42, an operation control unit 43, an absolute position data acquiring unit 44, and a storage unit 45.

The input/output unit 41 acquires the traveling condition data output from the management apparatus 10 through the radio communication device 36 and the absolute position data representing the absolute position of the dump truck 2 through the position detector 35. Further, the input/output unit 41 outputs an accelerator instruction signal to the driving device 24, outputs a brake instruction signal to the brake device 28, and outputs a steering instruction signal to the steering device 29.

The traveling condition data acquiring unit 42 acquires the traveling condition data including the target travel track RP and sent from the management apparatus 10.

The operation control unit 43 outputs an operation control signal of controlling the traveling device 21 of the dump truck 2 based on the specified traveling condition data. The traveling device 21 includes the brake device 28 and the steering device 29. The operation control unit 43 outputs an operation control signal to the traveling device 21 including the driving device 24, the brake device 28, and the steering device 29. The operation control signal includes an accelerator signal output to the driving device 24, a brake instruction signal output to the brake device 28, and a steering instruction signal output to the steering device 29.

The absolute position data acquiring unit 45 acquires the absolute position data of the dump truck 2 from the detection result of the position detector 35.

The storage unit 45 stores the traveling condition data of the dump truck 2 acquired from the radio communication device 36. The traveling condition data includes the target travel track RP representing the target travel track RP.

Figure 6:
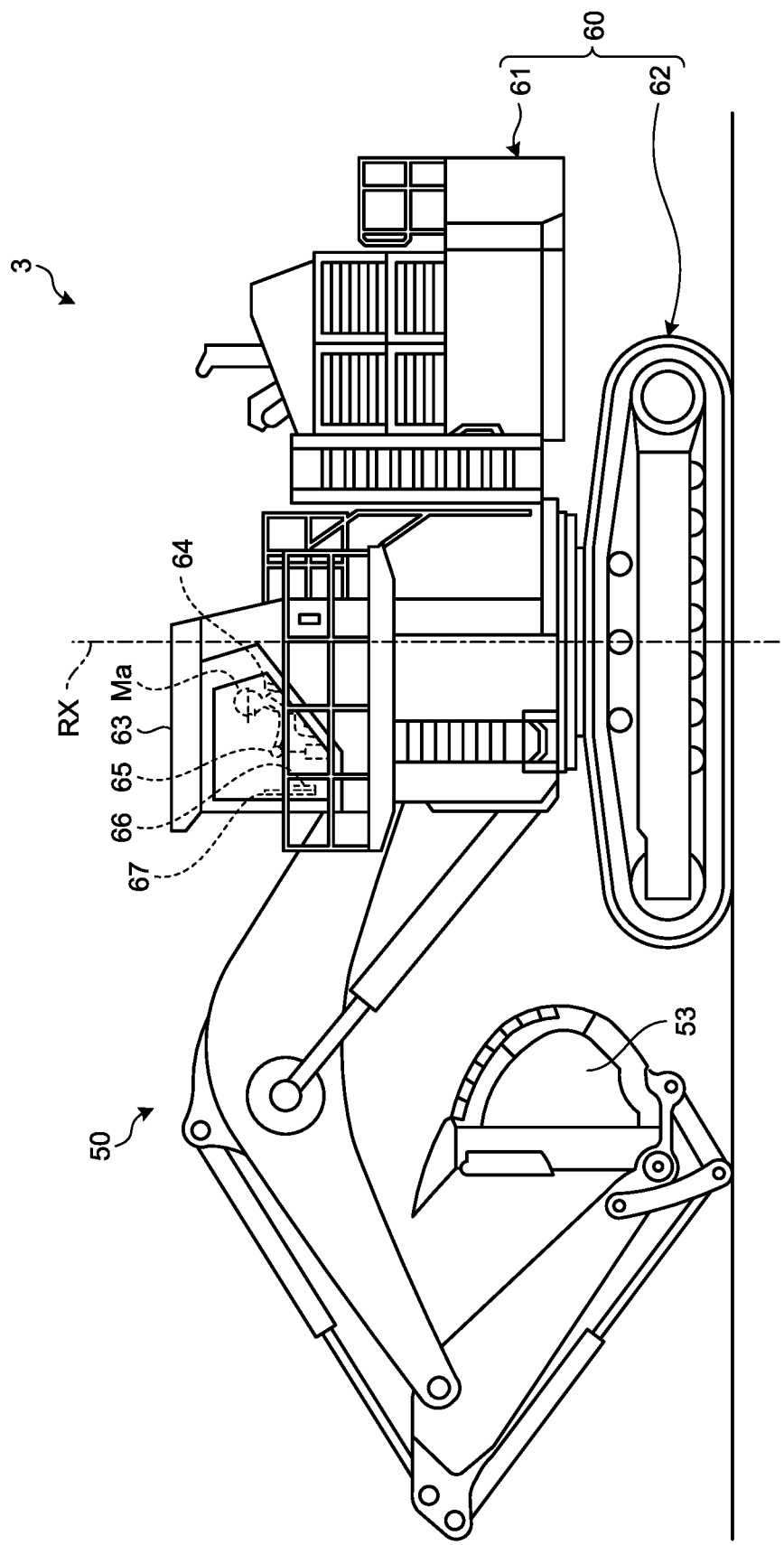
FIG. 6 is a diagram schematically illustrating an example of an excavator according to the first embodiment.
Figure 7:
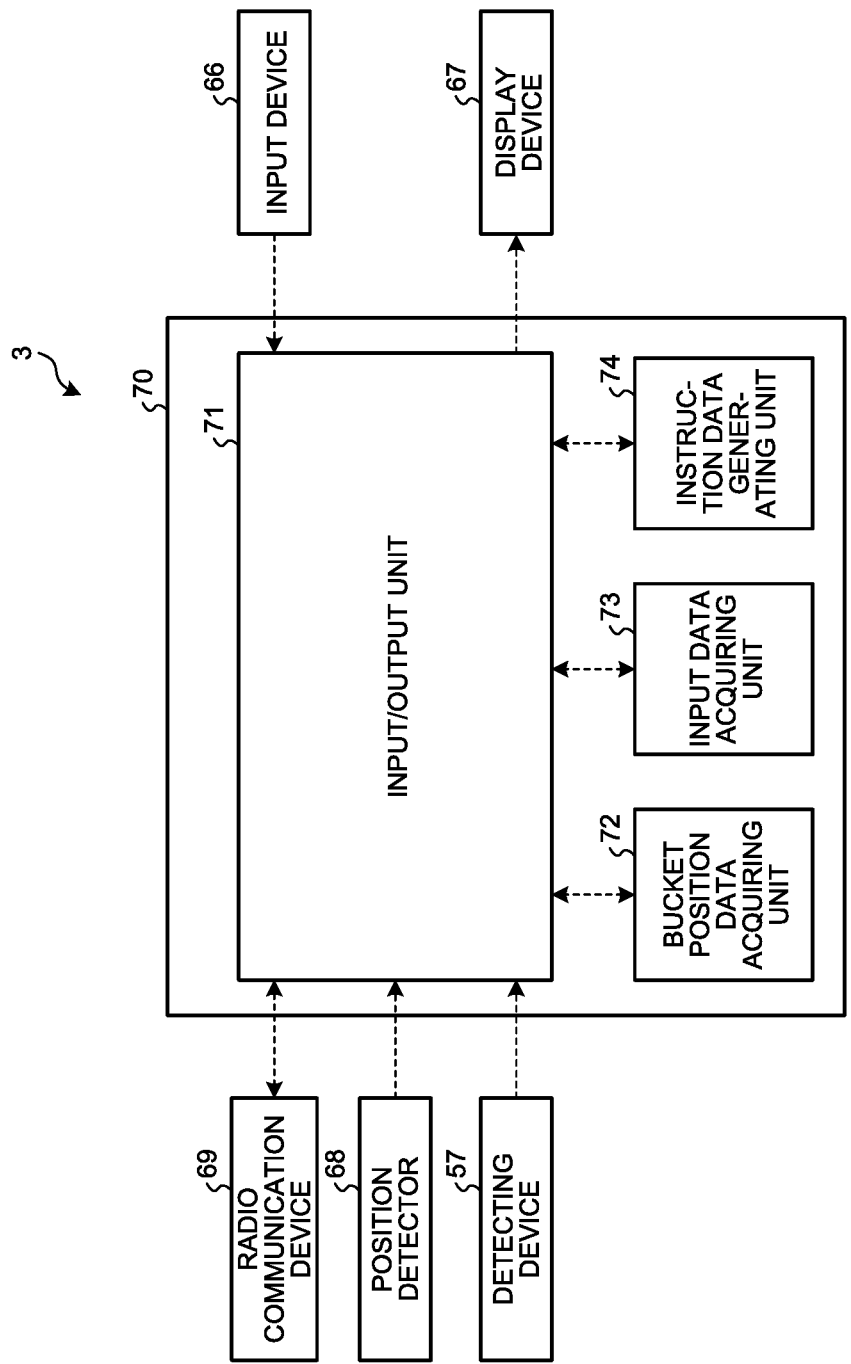
FIG. 7 is a functional block diagram illustrating an example of an excavator control device according to the first embodiment.

Next, the excavator 3 according to the embodiment will be described. FIG. 6 is a diagram schematically illustrating an example of the excavator 3 according to the embodiment. FIG. 7 is a functional block diagram of a control device 70 of the excavator 3 according to the embodiment. The control device 70 is mounted on the excavator 3.

As illustrated in FIG. 6, the excavator 3 includes a working implement 50 which is operated by a hydraulic pressure and a vehicle body 60 which supports the working implement 50. The vehicle body 60 includes an upper swing body 61 and a lower travel body 62 which supports the upper swing body 61. The upper swing body 61 includes a cab 63 with an operation room. A driver seat 64 on which an operator Ma sits, an operation lever 65 which is operated by the operator Ma, an input device 66 which is operated by the operator Ma, and a display device 67 are disposed in the operation room.

As illustrated in FIG. 7, the excavator 3 includes a detecting device 57 which detects the relative position of a bucket 53 with respect to the upper swing body 61. Further, the excavator 3 includes a position detector 68 which detects the absolute position of the upper swing body 61 and a radio communication device 69.

The position detector 68 includes a GPS receiver and an inertial measurement unit (IMU) and detects the GPS position (absolute position) and the direction of the upper swing body 61 in the excavator 3. The relative position of a blade edge 53B of the bucket 53 with respect to the upper swing body 61 is detected by the detecting device 57. The relative position of the bucket may be specified to be located at a point separated from a swing center by a predetermined distance in the direction of the upper swing body 61 and may be specified by the detection of the angles of a boom, an arm, and the bucket. The absolute position of the blade edge 53B of the bucket 53 is calculated based on the detection result of the position detector 68 and the detection result of the detecting device 57.

The communication system 9 includes the radio communication device 69 provided in the excavator 3. The radio communication device 69 can perform radio communication with respect to the management apparatus 10.

Figure 9:
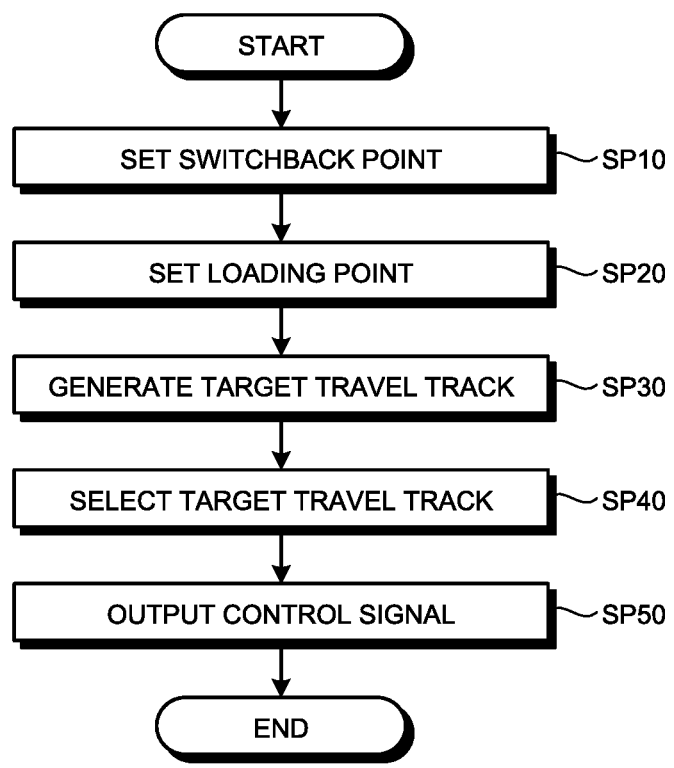
FIG. 9 is a flowchart illustrating an example of a dump truck control method according to the first embodiment.

Next, the control device of the excavator 3 according to the embodiment will be described. FIG. 9 is a functional block diagram of the control device 70 of the excavator 3 according to the embodiment. The control device 70 is mounted on the excavator 3.

As illustrated in FIG. 9, the excavator 3 includes the radio communication device 69, the position detector 68, the detecting device 57, the control device 70, the input device 66, and the display device 67.

The control device 70 includes an input/output unit 71, a bucket position data acquiring unit 72, an input data acquiring unit 73, and an instruction data generating unit 74.

The input/output unit 71 acquires position data representing the position of the excavator 3 and output from the position detector 68, bucket position data representing the position of the bucket 53 and detected by the detecting device 57, and input data generated by the operation of the input device 66. Further, the input/output unit 41 outputs instruction data generated by the instruction data generating unit 74 to the management apparatus 10 through the radio communication device 69.

The bucket position data acquiring unit 72 acquires position data representing the absolute position of the upper swing body 61 detected by the position detector 68 and position data representing the relative position of the bucket 53 with respect to the upper swing body 61 detected by the detecting device 57. The bucket position data acquiring unit 72 calculates bucket position data representing the absolute position of the bucket 53 based on position data representing the absolute position of the upper swing body 61 detected by the position detector 68 and position data representing the relative position of the bucket 53 with respect to the upper swing body 61 detected by the detecting device 57.

The input data acquiring unit 73 acquires input data generated by the input device 66 through the operation of the operator Ma.

The instruction data generating unit 74 generates instruction data of instructing the setting of the work point of the mining machine 4. In the embodiment, the instruction data generating unit 74 generates instruction data of instructing the setting of the loading point of the dump truck 2 in the loading place LPA of the mine. As a method of setting the loading point, for example, the operator Ma operates the input device 66 while disposing the bucket 53 at a desired position through the operation of the operation lever 65. The instruction data includes bucket position data representing the absolute position of the bucket 53 at a time point in which the input device 66 is operated. The bucket position data of the bucket 53 at a time point in which input data generated by the input device 66 through the operation of the input device 66 is acquired by the input data acquiring unit 73 is set as a loading point. In this way, in the embodiment, when the input device 66 provided in the excavator 3 is operated, the instruction data of instructing the setting of the loading point is generated by the instruction data generating unit 74. The instruction data generated by the instruction data generating unit 74 is sent to the management apparatus 10 through the radio communication device 69.

Figure 8:
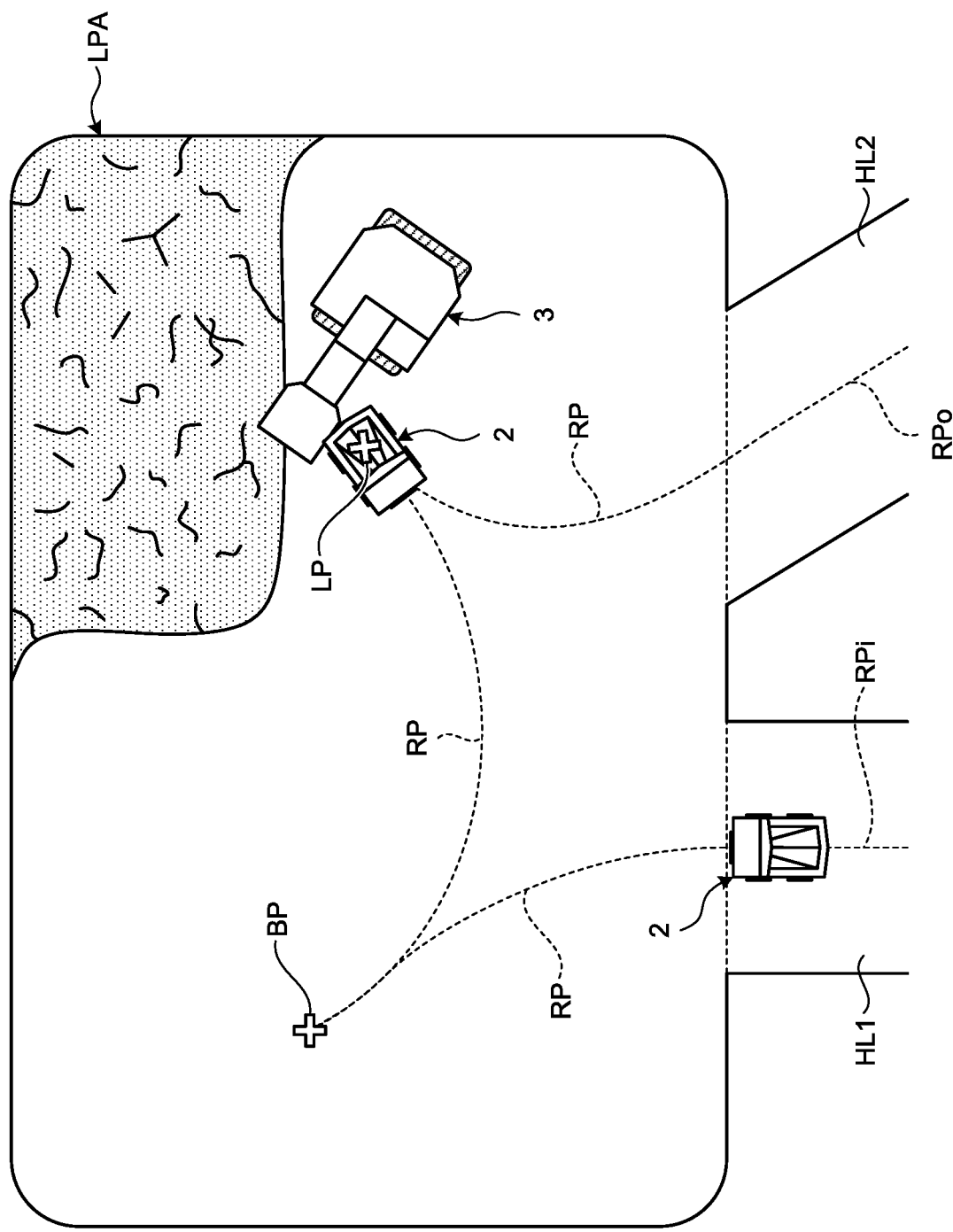
FIG. 8 is a schematic diagram illustrating an example of an operation of the dump truck according to the first embodiment.

Next, an example of an operation of the dump truck 2 according to the embodiment will be described. FIG. 8 is a schematic diagram illustrating an example of an operation of the dump truck 2 according to the embodiment in the loading place LPA.

The loading place LPA is an area in which the loading operation for the dump truck 2 is performed. The excavator 3 is disposed in the loading place LPA. A first transportation track HL1 in which the dump truck 2 entering and leaving from the loading place LPA travels and a second transportation track HL2 in which the dump truck 2 leaving from the loading place LPA travels are connected to the loading place LPA. Further, the transportation track may have a configuration in which only one transportation track HL is connected to the loading place LPA.

The travel track generating unit 123 of the management apparatus 10 generates a target travel track RPi of the dump truck 2 in the first transportation track HL1, a target travel track RPo of the dump truck 2 in the second transportation track HL2, and the target travel track RP of the dump truck 2 in the loading place LPA.

The switchback point setting unit 121 of the management apparatus 10 sets the switchback point BP in the loading place LPA. The work point setting unit 122 sets the loading point LP in the loading place LPA. The switchback point BP indicates a target point for the absolute position of the dump truck 2 to be switched back. The loading point LP indicates a target point for the absolute position of the dump truck 2 when the excavator 3 performs a loading operation. The dump truck 2 which enters the loading place LPA from the first transportation track HL1 while moving forward is switched back at the switchback point BP and moves to the loading point LP while moving backward. The dump truck 2 which performs a loading operation in the loading point LP leaves from the loading place LPA to the second transportation track HL2 while moving forward.

In the embodiment, the loading point LP is specified by, for example, the operator Ma of the excavator 3. The operator Ma operates the operation lever 65 so that the bucket 53 of the working implement 50 is disposed at a desired position. While the bucket 53 is disposed at a desired position, the operator Ma operates the input device 66. Bucket position data representing the absolute position of the bucket 53 at a time point in which input data generated by the input device 66 through the operation of the input device 66 is acquired by the input data acquiring unit 73 is set in the loading point LP.

Instruction data including the position data of the loading point LP set by the operator Ma is generated by the instruction data generating unit 74 of the excavator 3. The instruction data generated by the instruction data generating unit 74 is sent to the management apparatus 10 through the radio communication device 69.

The data acquiring unit 124 of the management apparatus 10 acquires instruction data including the position data of the loading point LP specified by the operator Ma from the excavator 3. The work point setting unit 122 of the management apparatus 10 sets the loading point LP based on the instruction data sent from the excavator 3.

The travel track generating unit 123 generates the target travel track RP from the entrance of the loading place LPA so that the target travel track RPi of the first transportation track HL1 is connected to the switchback point BP set by the switchback point setting unit 121. Further, the travel track generating unit 123 generates the target travel track RP so that the switchback point BP set by the switchback point setting unit 121 is connected to the loading point LP set by the work point setting unit 122. Further, the travel track generating unit 123 generates the target travel track RP to the exit of the loading place LPA so that the loading point LP set by the work point setting unit 122 is connected to the target travel track RPo of the second transportation track HL2.

Target travel track data generated by the travel track generating unit 123, switchback point data set by the switchback point setting unit 121, and loading point data (work point data) set by the work point setting unit 122 are sent to the dump truck 2 through the communication system 9. In the embodiment, the target travel track data generated by the travel track generating unit 123 and selected by the travel track selecting unit 125 is sent to the dump truck 2 through the communication system 9. The dump truck 2 travels along the first transportation track HL1, the loading place LPA, and the second transportation track HL2 in accordance with the target travel track RPi of the first transportation track HL1, the target travel track RP including the switchback point BP and the loading point LP of the loading place LPA, and the target travel track RPo of the second transportation track HL2 generated by the management apparatus 10.

Figure 10:
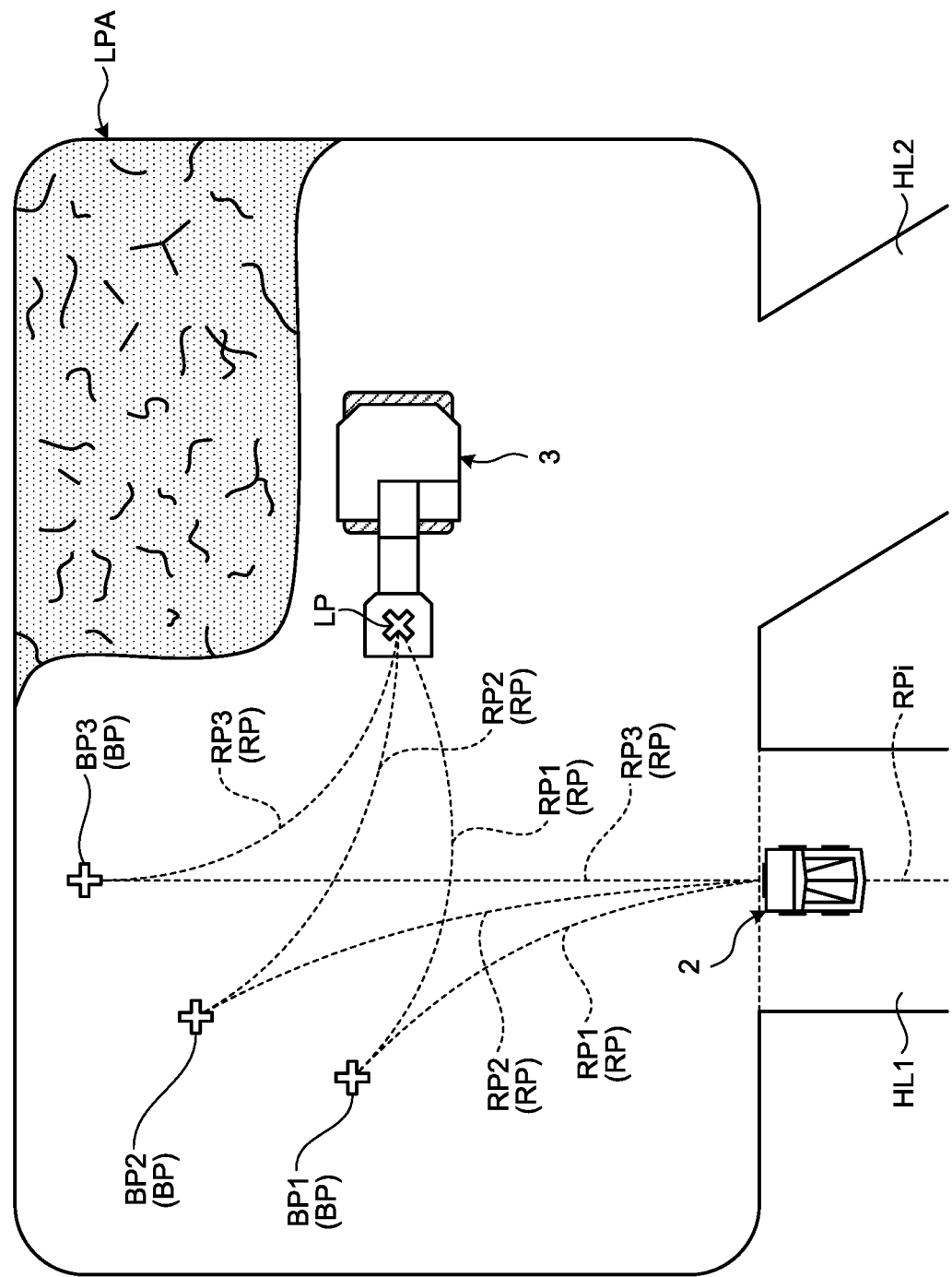
FIG. 10 is a schematic diagram illustrating an example of the dump truck control method according to the first embodiment.

Next, a method of controlling the dump truck 2 according to the embodiment will be described. FIG. 9 is a flowchart illustrating an example of a method of controlling the dump truck 2 according to the embodiment. FIG. 10 is a schematic diagram illustrating an example of a method of controlling the dump truck 2 according to the embodiment.

The position of the switchback point BP is set by the switchback point setting unit 121 of the management apparatus 10 (step SP10). In the embodiment, the switchback point setting unit 121 sets a plurality of switchback points BP of the dump truck 2 in the loading place LPA. As illustrated in FIG. 10, in the embodiment, for example, three switchback points BP1, BP2, and BP3 are set at intervals. The plurality of switchback points BP (BP1, BP2, and BP3) are set at intervals inside the loading place LPA.

The setting of the position of the switchback point BP may be performed by, for example, a manager of the control facility 7 or may be performed by the operator Ma of the excavator 3. For example, the manager of the control facility 7 may set the switchback point BP by operating the input device 17. Further, a plurality of points may be automatically set by the switchback point setting unit 121 of the management apparatus 10. The operator Ma of the excavator 3 may set the switchback point BP by operating the input device 66. When the operator Ma of the excavator 3 sets the switchback point BP, the input data for setting the switchback point BP generated by the operation of the input device 66 is sent from the excavator 3 to the management apparatus 10 through the communication system 9.

The work point setting unit 122 sets one position of the loading point LP of the dump truck 2 in the loading place LPA (step SP20).

As described above, the loading point LP is specified by, for example, the operator Ma of the excavator 3. The operator Ma operates the input device 66 while the bucket 53 is disposed at a desired position. The instruction data generating unit 74 of the excavator 3 generates instruction data of instructing the setting of the loading point LP of the dump truck 2 based on the bucket position data representing the absolute position of the bucket 53 at a time point in which input data generated by the operation of the input device 66 is acquired by the input data acquiring unit 73. The data acquiring unit 124 of the management apparatus 10 acquires the instruction data generated by the instruction data generating unit 74 from the excavator 3 through the communication system 9. The work point setting unit 122 of the management apparatus 10 sets the loading point LP based on the instruction data acquired by the data acquiring unit 124. Further, the position of the loading point may be automatically set by the work point setting unit 122 of the management apparatus 10.

The target travel track RP is generated based on the set switchback point BP and the loading point LP (step SP30). As illustrated in FIG. 10, the travel track generating unit 123 generates a plurality of target travel tracks RP (RP1, RP2, and RP3) so that the target travel track RPi of the first transportation track HL1 is connected to each of the plurality of switchback points BP (BP1, BP2, and BP3) of the loading place LPA.

Further, the travel track generating unit 123 generates the plurality of target travel tracks RP (RP1, RP2, and RP3) so that each of the plurality of switchback points BP (BP1, BP2, and BP3) is connected to the work point LP. In the example illustrated in FIG. 10, the plurality of target travel tracks RP include the target travel track RP1 which connects the switchback point BP1 to the work point LP, the target travel track RP2 which connects the switchback point BP2 to the work point LP, and the target travel track RP3 which connects the switchback point BP3 to the work point LP.

The travel track selecting unit 125 selects the target travel track RP in which the dump truck 2 travels among the plurality of target travel tracks RP (RP1, RP2, and RP3) generated by the travel track generating unit 123 (step SP40).

The target travel track RP generated by the travel track generating unit 123 and selected by the travel track selecting unit 125 is sent to each of the plurality of dump trucks 2 operated in the mine. Each of the plurality of dump trucks 2 travels within the loading place LPA along any target travel track RP selected by the travel track selecting unit 125.

The travel control unit 126 outputs a control signal for controlling the traveling of the dump truck 2 entering the loading place LPA from the first transportation track HL1 (step SP50). In the embodiment, the travel control unit 126 outputs a control signal to the dump truck 2 so that the dump truck 2 entering the loading place LPA travels along the target travel track RP selected by the travel track selecting unit 125.

When the travel track selecting unit 125 selects the target travel track RP in which the dump truck 2 travels from the plurality of target travel tracks RP (RP1, RP2, and RP3) set in the loading place LPA, the travel control unit 126 outputs a control signal to the dump truck 2 so that the dump truck 2 travels along the selected target travel track RP.

In the embodiment, the travel track selecting unit 125 selects a first target travel track RP as the target travel track RP in which the first dump truck 2 exists in the loading place LPA and selects a second target travel track RP different from the first target travel track RP as the target travel track RP in which a second dump truck 2 subsequently entering the loading place LPA exists in the loading place LPA.

In the embodiment, the travel track selecting unit 125 selects the target travel track RP so that the dump truck 2 sequentially passes through the plurality of switchback points BP (BP1, BP2, and BP3). For example, the plurality of dump trucks 2 are controlled so that a first operation of causing the first dump truck 2 to travel along the target travel track RP1 passing through the switchback point BP1 and directed to the loading point LP, a second operation of causing the second dump truck 2 to travel along the target travel track RP2 passing through the switchback point BP2 and directed to the loading point LP, and a third operation of causing the third dump truck 2 to travel along the target travel track RP3 passing through the switchback point BP3 and directed to the loading point LP are performed in such a manner that the first operation, the second operation, and the third operation are performed sequentially and the first operation, the second operation, and the third operation are performed sequentially again.

In the embodiment, the switchback point setting unit 121 sets the plurality of switchback points BP (BP1, BP2, and BP3) so that the generation of a rut in the loading place LPA is suppressed. The travel track generating unit 123 sets the plurality of target travel tracks RP (RP1, RP2, and RP3) to correspond to the plurality of switchback points BP in the loading place LPA. The travel track selecting unit 125 selects the target travel track RP through which the dump truck 2 passes so that the generation of a rut in the loading place LPA is suppressed. The travel track control unit 126 sends a control signal to each dump truck 2 so that the dump truck travels along the selected target travel track RP.

For example, when a gap between the plurality of switchback points BP is narrow or a gap between the plurality of target travel tracks RP is narrow, the vehicle wheels 26 of the plurality of dump trucks 2 substantially pass through the same route. As a result, there is a high possibility that a deep rut is generated. The switchback point setting unit 121 may set the positions of the plurality of switchback points BP so that a gap between the plurality of switchback points BP is larger than, for example, the width (tire width) of the vehicle wheel 26.

Further, when the dump trucks continuously pass through a specific switchback point BP among the plurality of switchback points BP even when the plurality of switchback points BP are set, there is a possibility that a deep rut is generated.

Here, the travel track selecting unit 125 selects the switchback point BP through which the dump truck 2 passes so that the plurality of dump trucks 2 do not continuously pass through the same switchback point BP among the plurality of switchback points BP among the plurality of switchback points BP. For example, the travel track selecting unit 125 may sequentially or randomly select the switchback point BP through which the dump truck 2 passes among the plurality of switchback points BP. The travel track selecting unit 125 may select at least the target travel track RP so that the second dump truck 2 does not pass through the first switchback point BP through which the first dump truck 2 passes and passes through the second switchback point BP different from the first switchback point BP when the first dump truck 2 enters the loading place LPA and the dump truck 2 subsequently entering the loading place LPA is the second dump truck 2 different from the first dump truck 2.

Additionally, when the first dump truck 2 enters the same loading place LPA even when the first switchback point BP1 is selected as the switchback point BP through which the first dump truck 2 passes in a certain loading place LPA, a different switchback point BP may be selected.

As described above, according to the embodiment, the plurality of switchback points BP are set for one loading point LP, the plurality of target travel tracks RP respectively connecting the plurality of switchback points BP to the loading point LP are generated based on the positions of the plurality of switchback points BP, and each of the plurality of dump trucks 2 travels to the loading point LP along the target travel track RP selected among the plurality of target travel tracks RP. For this reason, it is possible to suppress the dump truck 2 from continuously traveling along the same target travel track RP. Thus, the generation of a deep rut in the loading place LP is suppressed. Since the generation of the deep rut is suppressed, the ground leveling work is suppressed and hence deterioration in productivity of the mine is suppressed.

Further, in the embodiment, the travel track selecting unit 125 selects the switchback point BP so that the dump trucks 2 sequentially pass through the plurality of switchback points BP and controls the dump trucks 2 so that the dump trucks sequentially pass through the plurality of switchback points BP. Accordingly, for example, a period in which the dump truck 2 passes through the switchback point BP1 and passes through the switchback point BP1 again, a period in which the dump truck 2 passes through the switchback point BP2 and passes through the switchback point BP2 again, and a period in which the dump truck 2 passes through the switchback point BP3 and passes through the switchback point BP3 again can be set to be substantially equal to one another. Accordingly, since a deviation in the number of times in which the dump truck 2 passes through the plurality of switchback points BP and vice versa are suppressed, the generation of a deep rut is suppressed.

Additionally, in the embodiment, it is assumed that the travel control unit 126 outputs a control signal so that the dump truck 2 sequentially passes through the plurality of switchback points BP (BP1, BP2, and BP3). That is, it is assumed that the plurality of dump trucks 2 are controlled so as to sequentially perform the first operation of causing the first dump truck 2 to travel along the target travel track RP1 passing through the switchback point BP1 and directed to the loading point LP, the second operation of causing the second dump truck 2 to travel along the target travel track RP2 passing through the switchback point BP2 and directed to the loading point LP, and the third operation of causing the third dump truck 2 to travel along the target travel track RP3 passing through the switchback point BP3 and directed to the loading point LP in such a manner that the first operation, the second operation, and the third operation are performed sequentially and the first operation, the second operation, and the third operation are performed sequentially again. The first operation, the second operation, and the third operation may be changed in random whenever the dump truck 2 travels. As described above, the traveling of the dump trucks 2 may be controlled so that the dump trucks 2 do not continuously pass through the same switchback point BP. Further, the switchback point BP may be selected by using a frequency map as below.

<Second Embodiment>

A second embodiment will be described. The same reference signs will be given to the same or equivalent components of the above-described embodiment and the description will be simplified or omitted.

Figure 11:
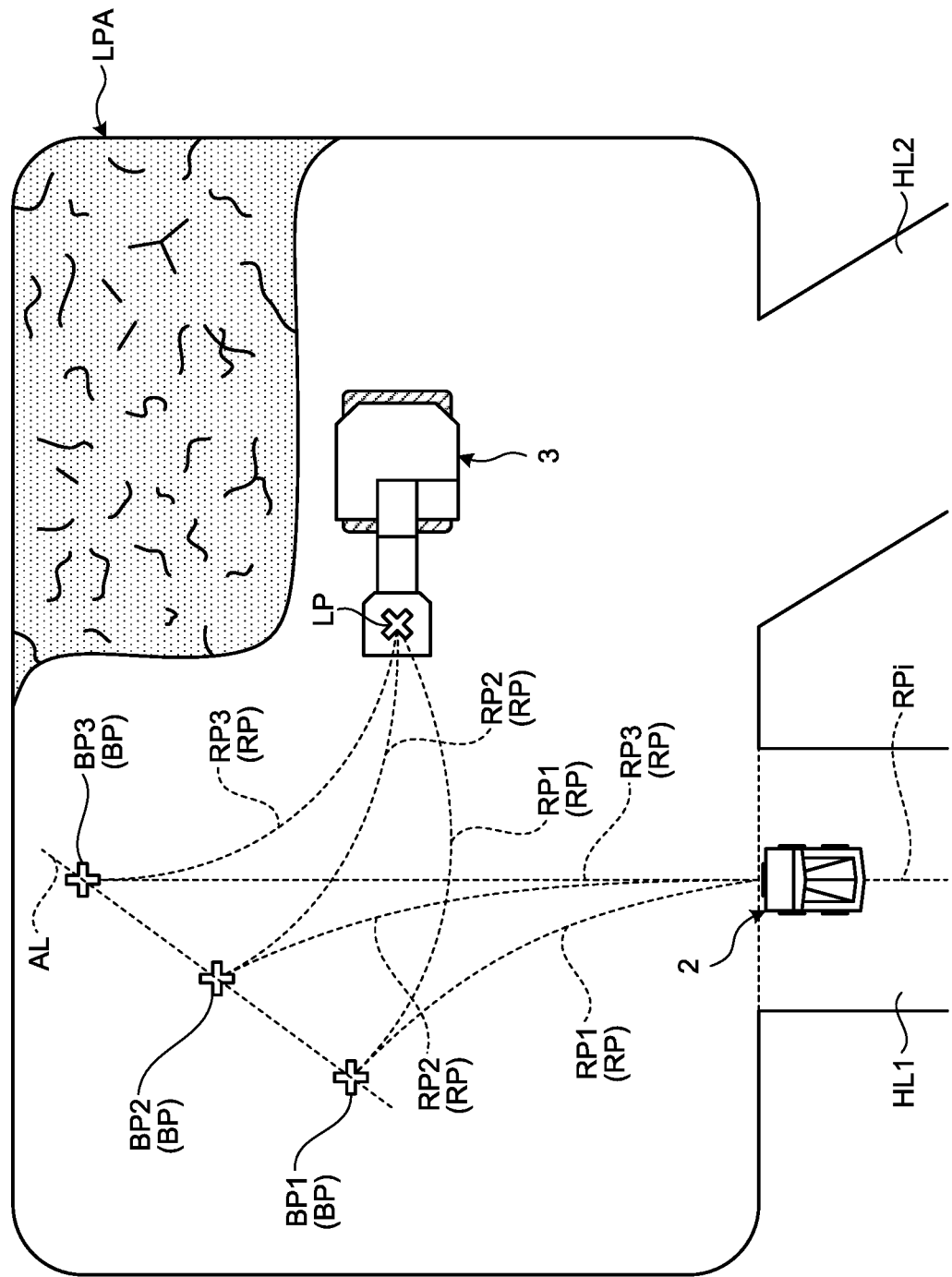
FIG. 11 is a schematic diagram illustrating an example of a dump truck control method according to a second embodiment.

FIG. 11 is a schematic diagram illustrating an example of a method of controlling the dump truck 2 according to the embodiment. As illustrated in FIG. 11, the switchback point setting unit 121 can set the plurality of switchback points BP along a specific line AL at intervals within the loading place LPA. In the example illustrated in FIG. 11, three switchback points BP (BP1, BP2, and BP3) are set along the specific line AL, but the switchback point BP can be set to any position on the specific line AL. The travel track selecting unit 125 selects the position of the switchback point BP through which the dump trucks 2 pass. As a specific travel track selecting method, for example, several predetermined switchback points may be set and selected sequentially as in FIG. 11, the switchback point BP may be selected while being moved by the same interval in the right and up direction from the switchback point BP1 of FIG. 11, or the switchback point BP may be selected in random on the specific line AL. Further, the switchback point BP may be selected by using a frequency map to be described below. In addition, any selection method can be employed.

As described above, when the specific line AL is set and the plurality of switchback points BP are set along the specific line AL, the generation of a deep rut in the loading place LPA is suppressed and hence deterioration in productivity of the mine is suppressed.

<Third Embodiment>

A third embodiment will be described. The same reference signs will be given to the same or equivalent components of the above-described embodiment and the description will be simplified or omitted.

Figure 12:
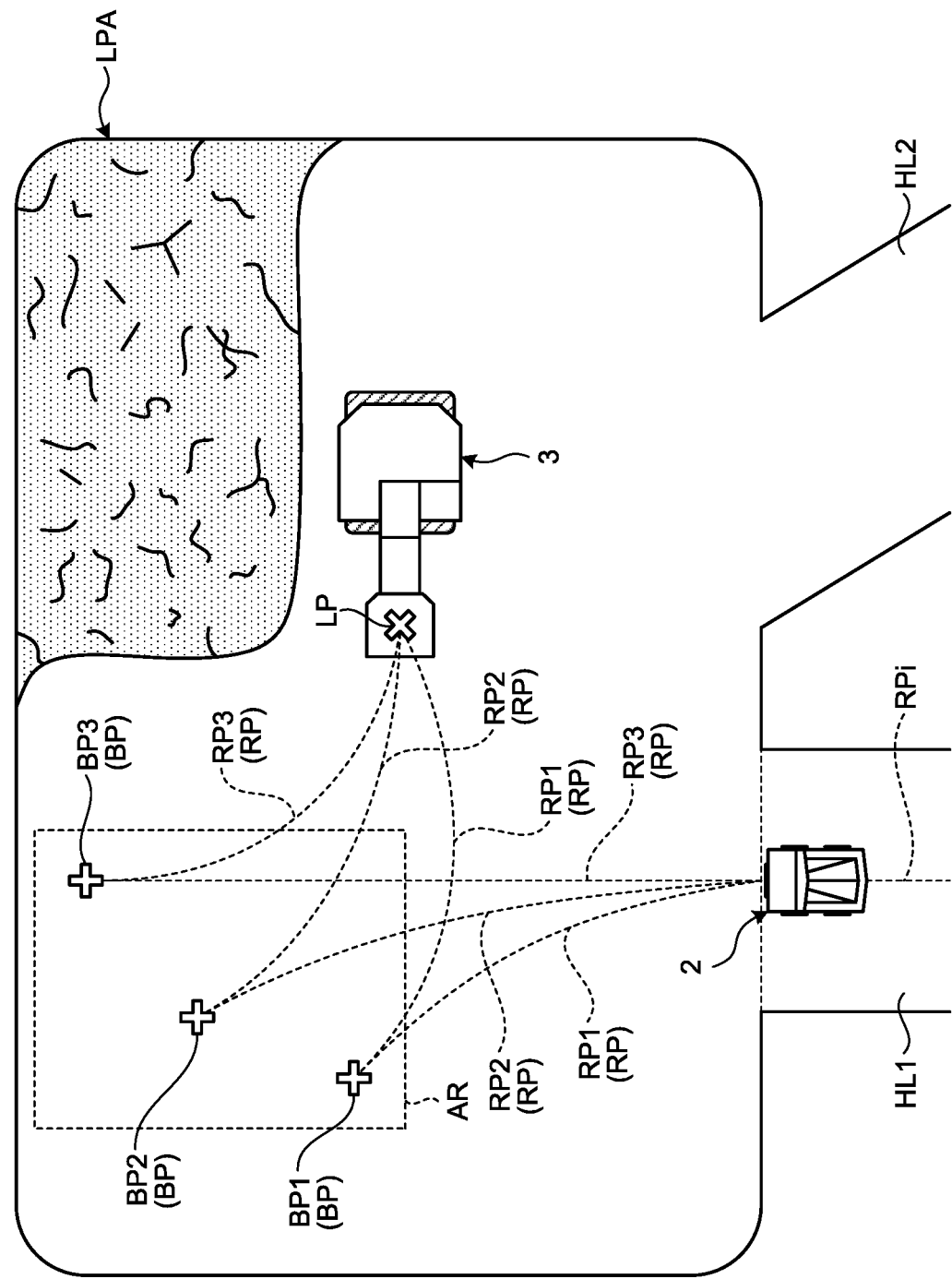
FIG. 12 is a schematic diagram illustrating an example of a dump truck control method according to a third embodiment.

FIG. 12 is a schematic diagram illustrating an example of a method of controlling the dump truck 2 according to the embodiment. As illustrated in FIG. 12, the switchback point setting unit 121 can set the plurality of switchback points BP within the specific area AR inside the loading place LPA at intervals. In the example illustrated in FIG. 12, three switchback points BP (BP1, BP2, and BP3) are set in the specific area AR at intervals, but the switchback point BP can be set to any position on the specific area AR. Whenever each dump truck 2 travels, the switchback point BP at a certain position through which the dump truck passes is selected by the travel track selecting unit 125. As a specific travel track selecting method, for example, several predetermined switchback points may be set and selected sequentially as in FIG. 12, the switchback point BP may be selected while being moved by the same interval from the switchback point BP1 of FIG. 12 in a predetermined direction (up, down, left/right, or obliquely), or the switchback point BP may be selected in random on the specific area AR. Further, the switchback point BP may be selected by using a frequency map to be described below. In addition, any selection method can be employed. The specific area AR may be set to any position inside the loading place LPA.

As described above, when the specific area AR is set and the plurality of switchback points BP are set in the specific area AR, the generation of a deep rut in the loading place LPA is suppressed and hence deterioration in productivity of the mine is suppressed.

<Fourth Embodiment>

A fourth embodiment will be described. The same reference signs will be given to the same or equivalent components of the above-described embodiment and the description will be simplified or omitted.

In the embodiment, a method will be described in which the travel track selecting unit 125 selects the switchback point BP through which the dump truck 2 passes among the plurality of switchback points BP so that the generation of a rut in the loading place LPA is suppressed based on the frequency map. A method of selecting the switchback point BP and the target travel track RP using the frequency map can be applied to, for example, the examples of the first to third embodiments. In the embodiment, the travel track selecting unit 125 changes the position of the switchback point BP so that the generation of a rut in the loading place LPA is suppressed. The travel track generating unit 123 changes the position (route) of the target travel track RP so that the generation of a rut in the loading place LPA is suppressed.

Figure 13:
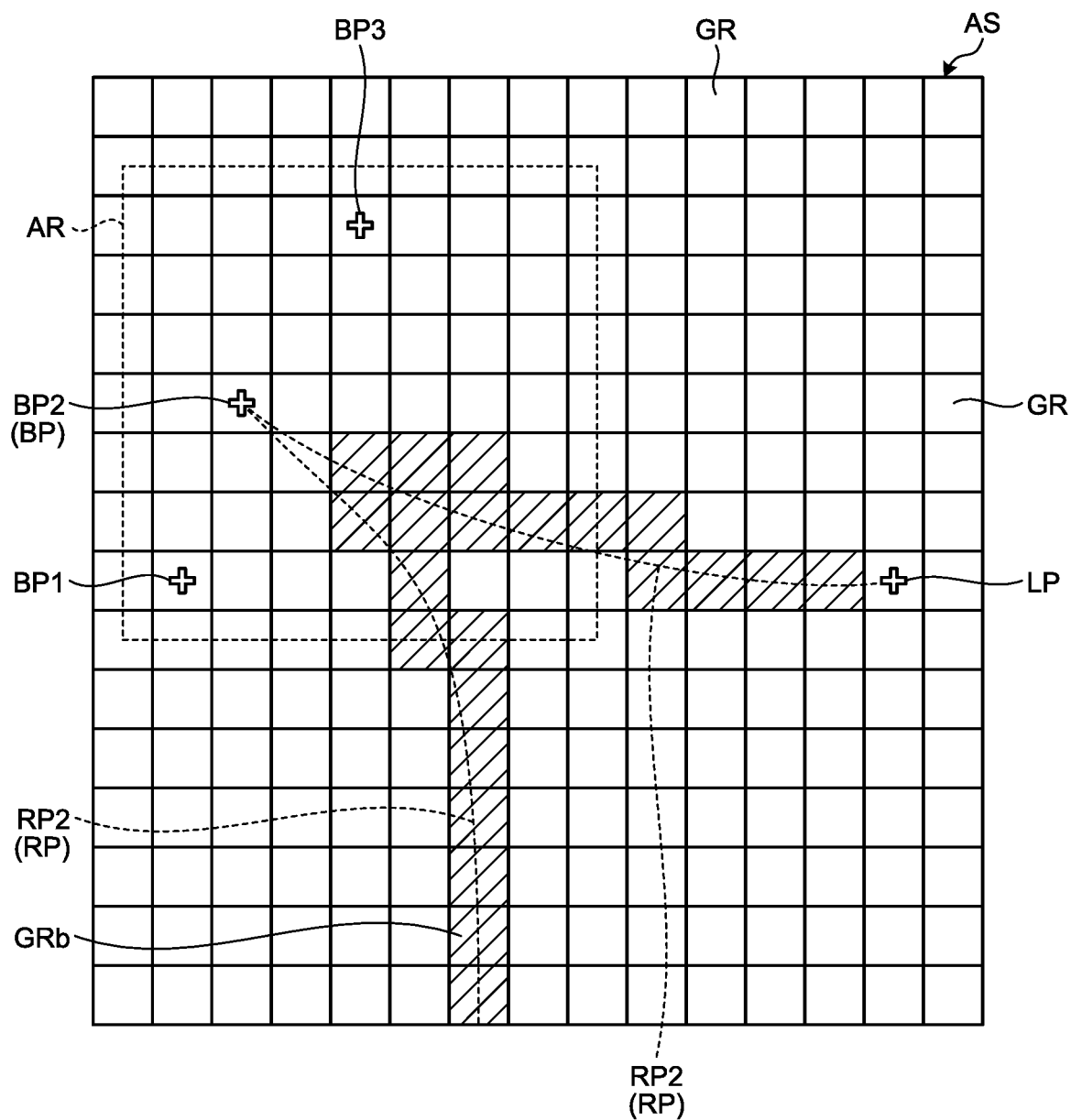
FIG. 13 is a schematic diagram illustrating an example of a dump truck control method according to a fourth embodiment.

FIG. 13 is a schematic diagram illustrating an example of a method of controlling the dump truck 2 according to the embodiment. In the embodiment, an example will be described in which the specific area AR described in the above-described third embodiment is used. The travel control unit 126 defines a predetermined area AS of the loading place LPA including the plurality of switchback points BP and the loading point LP by a plurality of grids GR. The specific area AR is set as a part of the predetermined area AS. The travel control unit 126 specifies the grid GR through which the vehicle wheel 26 of the dump truck 2 passes based on the absolute position data of the dump truck 2 detected by the position detector 35. The travel control unit 126 counts the number of times in which the vehicle wheel 26 of the dump truck 2 passes through the grid in each of the plurality of grids GR. That is, when the number of times of counting a certain grid GR is largely different from the number of times of counting the peripheral grid GR, it is thought that a rut is generated in that area. The switchback point setting unit 121 automatically changes the position of the switchback point BP so that the number of times in which the vehicle wheel 26 of the dump truck 2 passes through the grid GR does not become larger than the number of times in which the vehicle wheel passes through the peripheral grid GR in each of the plurality of grids GR set in the predetermined area AS while the position of the loading point LP is fixed. Further, the travel track generating unit 123 changes the route of the target travel track RP so that the number of times in which the vehicle wheel 26 of the dump truck 2 passes through the grid GR does not become larger than the number of times in which the vehicle wheel passes through the peripheral grid GR in each of the plurality of grids GR set in the predetermined area AS while the position of the loading point LP is fixed. Accordingly, the generation of a deep rut is suppressed.

In the example illustrated in FIG. 13, it is determined that the number of times in which the vehicle wheel 26 of the dump truck 2 passes through the grid GRb including the target travel track RP2 and the switchback point BP2 is larger than the number of times in which the dump truck passes through the peripheral grid GR of the grid GRb. In this case, the switchback point setting unit 121 changes the position of the switchback point BP in the specific area AR from the switchback point BP2 to, for example, the switchback point BP1 or the switchback point BP3.

Additionally, in the embodiment, a case has been described in which the number of times of counting the grid located on the target travel track RP increases, but the number of times of counting the grid located on the tire travel track of the actual travel track may be increased.

As described above, in the embodiment, the frequency map representing the frequency of the passage of the vehicle wheel 26 of the dump truck 2 in the predetermined area AS of the loading place LPA is made and the switchback point BP and the target travel track RP are set so that the vehicle wheel 26 does not travel highly frequently only in the specific area of the predetermined area AS with reference to the frequency map. Thus, the generation of a rut in the loading place LPA is suppressed and hence deterioration in productivity of the mine is suppressed.

<Fifth Embodiment>

A fifth embodiment will be described. The same reference signs will be given to the same or equivalent components of the above-described embodiment and the description will be simplified or omitted.

Figure 14:
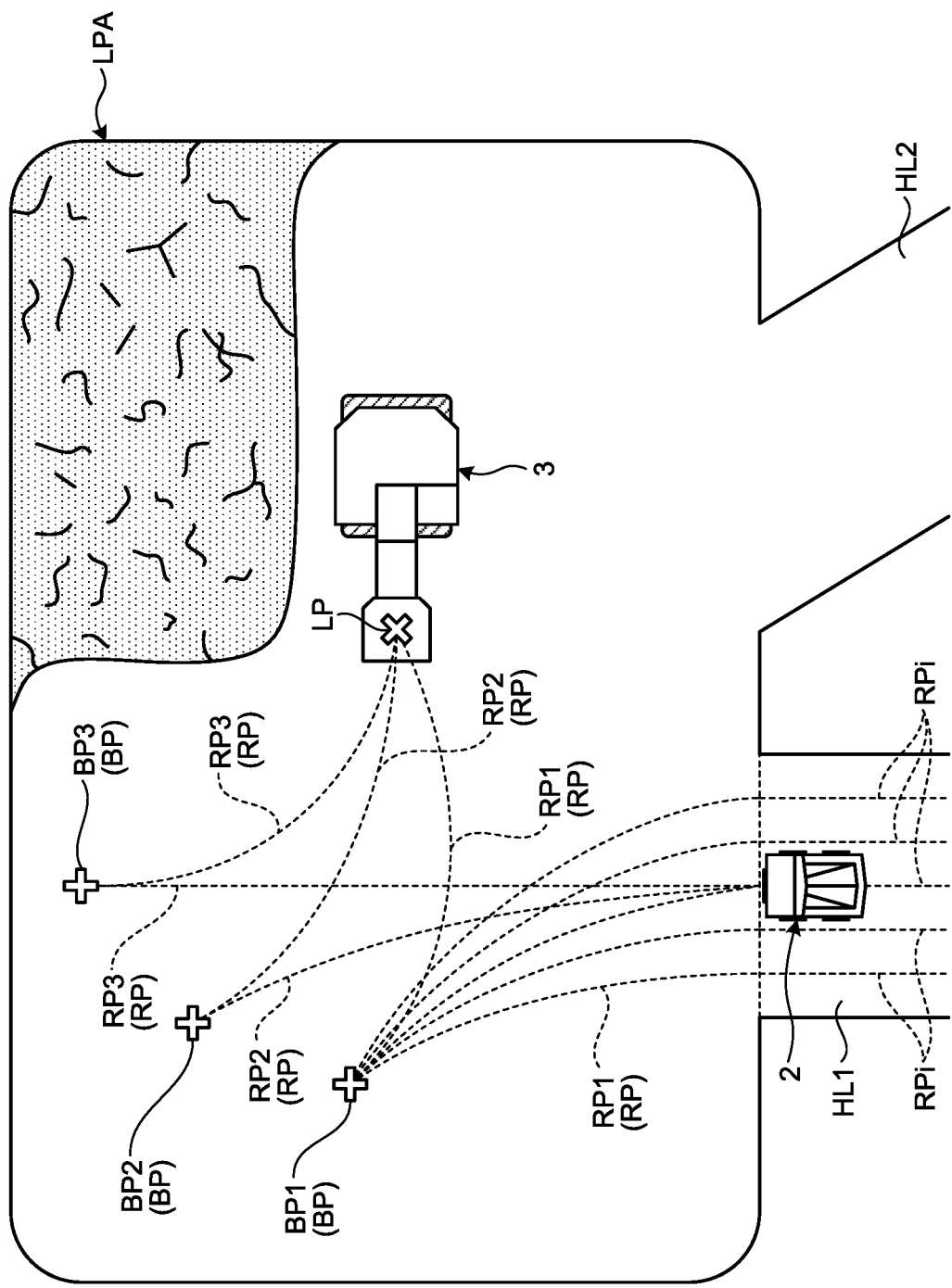
FIG. 14 is a schematic diagram illustrating an example of a dump truck control method according to a fifth embodiment.

FIG. 14 is a schematic diagram illustrating an example of a method of controlling the dump truck 2 according to the embodiment. As illustrated in FIG. 14, the travel track generating unit 123 can generate the plurality of target travel tracks RPi in the first transportation track HL1. In the example illustrated in FIG. 14, five target travel tracks RPi are generated in the first transportation track HL1. The travel control unit 126 controls the dump truck 2 so that the dump truck 2 in the first transportation track HL1 passes through each of the plurality of target travel tracks RPi. Accordingly, the generation of a deep rut in the first transportation track HL1 is suppressed.

In the embodiment, the travel track generating unit 123 sets the plurality of target travel tracks RPi in the first transportation track HL1 so that the switchback point BP is connected to each of the plurality of target travel tracks RPi of the first transportation track HL1. Further, FIG. 14 illustrates an example in which the switchback point BP1 is connected to each of five target travel tracks RPi of the first transportation track HL1. Although not illustrated in the drawings, the travel track generating unit 123 generates the plurality of target travel tracks RPi in the first transportation track HL1 so that the switchback point BP2 is connected to each of five target travel tracks RPi of the first transportation track HL1. Further, the travel track generating unit 123 generates the plurality of target travel tracks RPi in the first transportation track HL1 so that the switchback point BP3 is connected to each of five target travel tracks RPi of the first transportation track HL1.

As described above, according to the embodiment, since the plurality of target travel tracks RPi are generated even in the first transportation track HL1, the generation of a rut in the first transportation track HL1 is suppressed. Further, the generation of a rut is suppressed in a wide range in the loading place LPA.

<Sixth Embodiment>

A sixth embodiment will be described. The same reference signs will be given to the same or equivalent components of the above-described embodiment and the description will be simplified or omitted.

Figure 15:
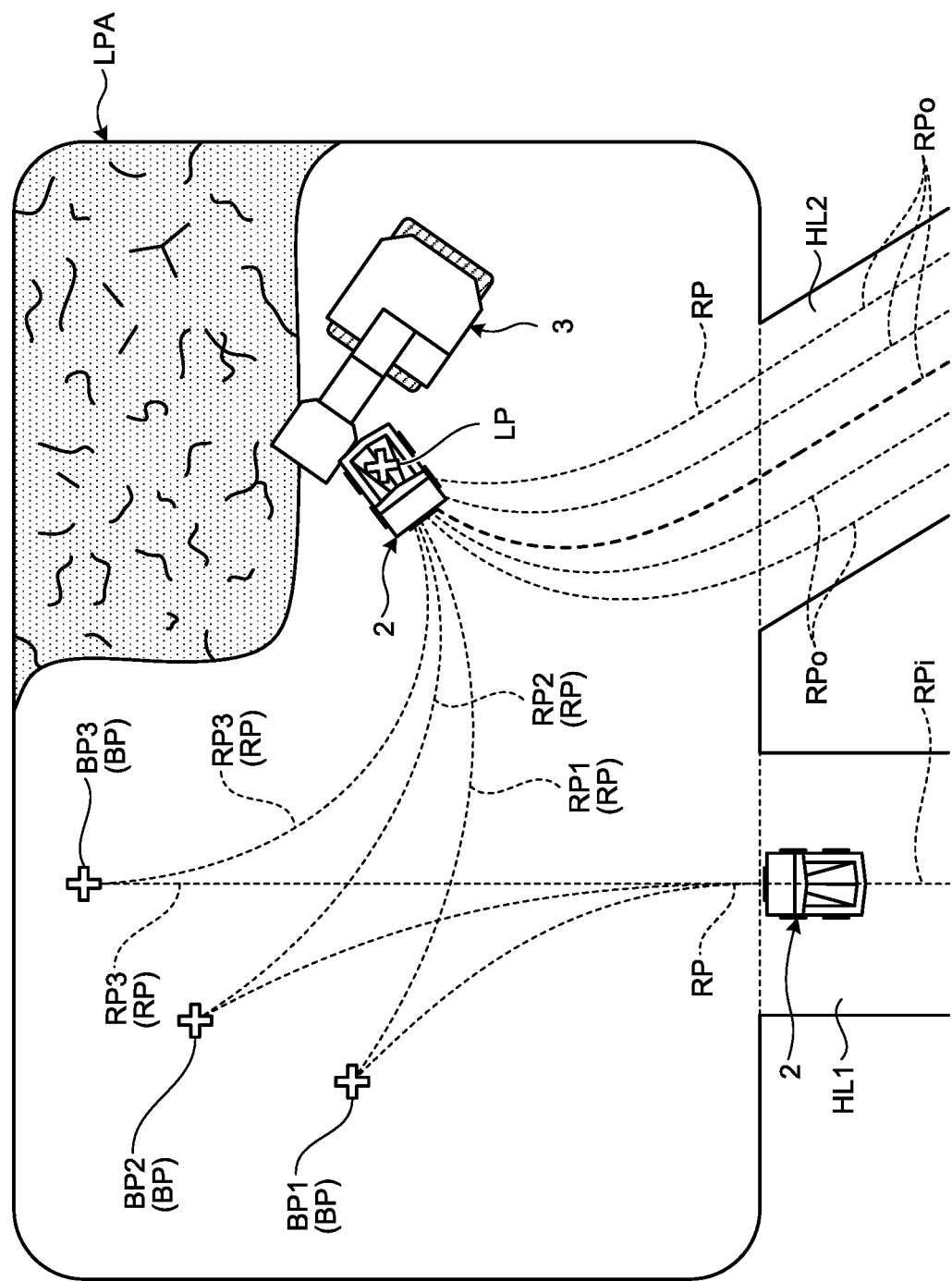
FIG. 15 is a schematic diagram illustrating an example of a dump truck control method according to a sixth embodiment.

FIG. 15 is a schematic diagram illustrating an example of a method of controlling the dump truck 2 according to the embodiment. As illustrated in FIG. 15, the switchback point setting unit 121 can set the plurality of switchback points BP at intervals. In the example illustrated in FIG. 15, five switchback points BP are set at the same interval along the specific line AL.

Further, as illustrated in FIG. 15, the travel track generating unit 123 can generate the plurality of target travel tracks RPo in the second transportation track HL2. In the example illustrated in FIG. 15, five target travel tracks RPo are generated in the second transportation track HL2. The travel control unit 126 controls the dump truck 2 so that the dump truck 2 passes through each of the plurality of target travel tracks RPo in the second transportation track HL2. Accordingly, the generation of a deep rut in the second transportation track HL2 is suppressed.

In the embodiment, the travel track generating unit 123 generates the plurality of target travel tracks RP in the second transportation track HL2 so that the loading point LP is connected to each of the plurality of target travel tracks RPo of the second transportation track HL2.

As described above, according to the embodiment, since the plurality of target travel tracks RPo are generated even in the second transportation track HL2, the generation of a rut even in the second transportation track HL2 is suppressed. Further, the generation of a rut is suppressed in a wide range even in the loading place LPA.

The dump truck 2 which leaves from the loading place LPA and travels along the second transportation track HL2 has a load loaded thereon. The total weight of the dump truck 2 having a load thereon is larger than the total weight of the empty dump truck 2. For that reason, when the dump truck 2 travels along the second transportation track HL2, a rut is easily generated in the second transportation track HL2. In the embodiment, since the plurality of target travel tracks RPo are generated in the second transportation track HL2, the generation of a rut can be effectively suppressed.

<Seventh Embodiment>

A seventh embodiment will be described. The same reference signs will be given to the same or equivalent components of the above-described embodiment and the description will be simplified or omitted.

Figure 16:
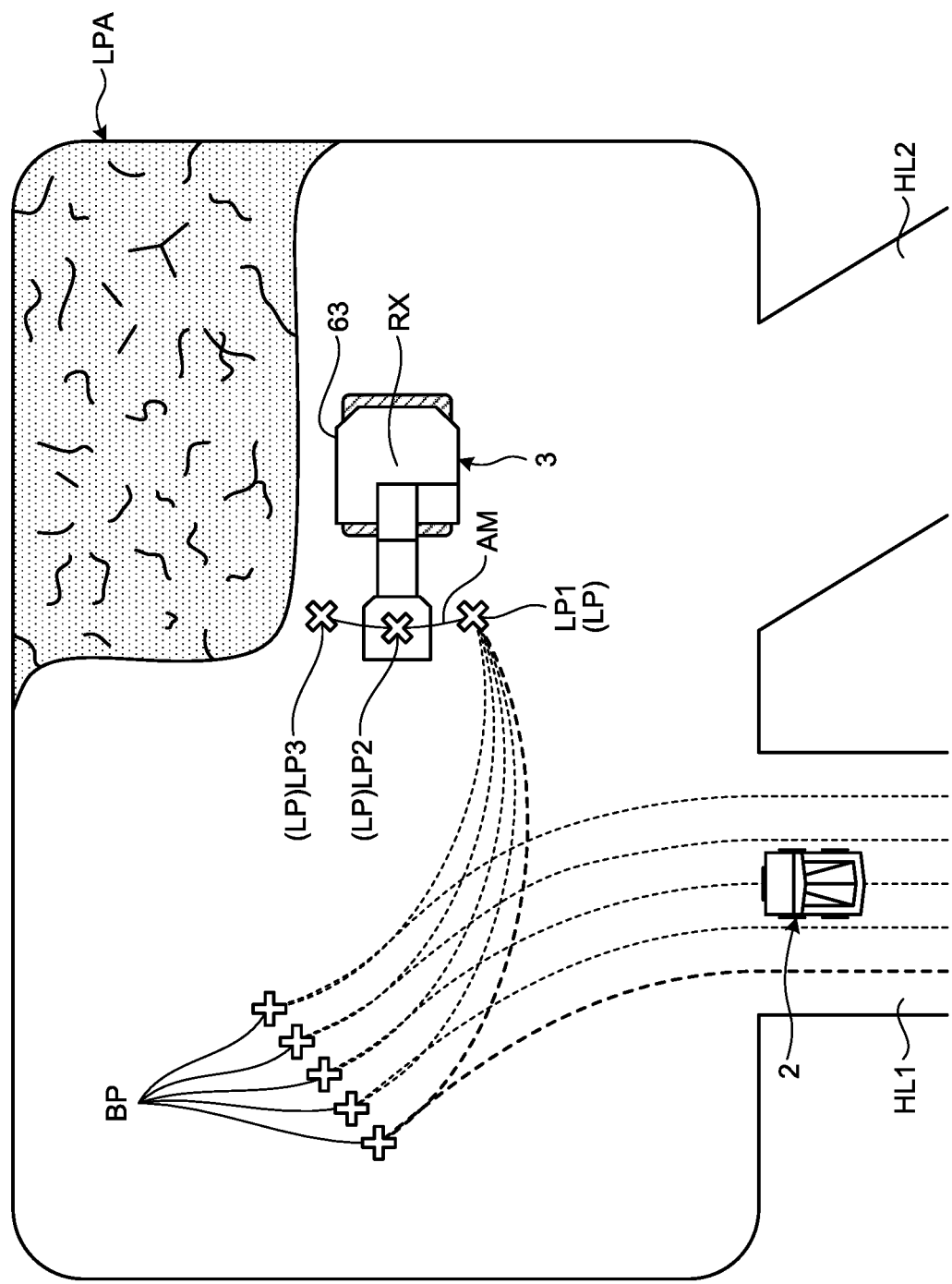
FIG. 16 is a schematic diagram illustrating an example of a dump truck control method according to a seventh embodiment.

FIG. 16 is a schematic diagram illustrating an example of a method of controlling the dump truck 2 according to the embodiment. As illustrated in FIG. 16, the work point setting unit 122 can set a plurality of loading points LP. The work point setting unit 122 can set the plurality of loading points LP at intervals. In the example illustrated in FIG. 16, the work point setting unit 122 sets three loading points LP (LP1, LP2, and LP3).

In the embodiment, the plurality of loading points LP are set along a specific line AM indicating the movement path of the bucket 53 when the upper swing body 61 of the excavator 3 swings about the swing axis RX.

In the embodiment, the travel track generating unit 123 generates the plurality of target travel tracks RP in the loading place LPA so that the switchback point BP is connected to each of the plurality of loading points LP. Further, FIG. 16 illustrates an example in which the loading point LP1 is connected to each of five switchback points BP. Although not illustrated in the drawings, the travel track generating unit 123 generates the plurality of target travel tracks RP in the loading place LPA so that the loading point LP2 is connected to each of five switchback points BP. Further, the travel track generating unit 123 generates the plurality of target travel tracks RP in the loading place LPA so that the loading point LP3 is connected to each of five switchback points BP.

As described above, according to the embodiment, since the plurality of loading points LP (LP1, LP2, and LP3) are set in the loading place LPA, the generation of a rut in a wide range of the loading place LPA from the switchback point BP to the loading point LP is suppressed.

Additionally, the components set in the plurality of loading points LP as in the embodiment can be appropriately combined with the components described in the above-described embodiments. For example, in the embodiment illustrated in FIG. 16, the number of switchback points BP may be one or the plurality of switchback points BP may be set in the specific area AR or along the specific line AL. Further, the dump truck 2 which enters any one of the plurality of loading points LP from the switchback point BP may be set so that the loading point LP is sequentially or randomly selected among the plurality of loading points LP or is selected based on the frequency map.

<Eighth Embodiment>

An eighth embodiment will be described. The same reference signs will be given to the same or equivalent components of the above-described embodiment and the description will be simplified or omitted.

Figure 17:
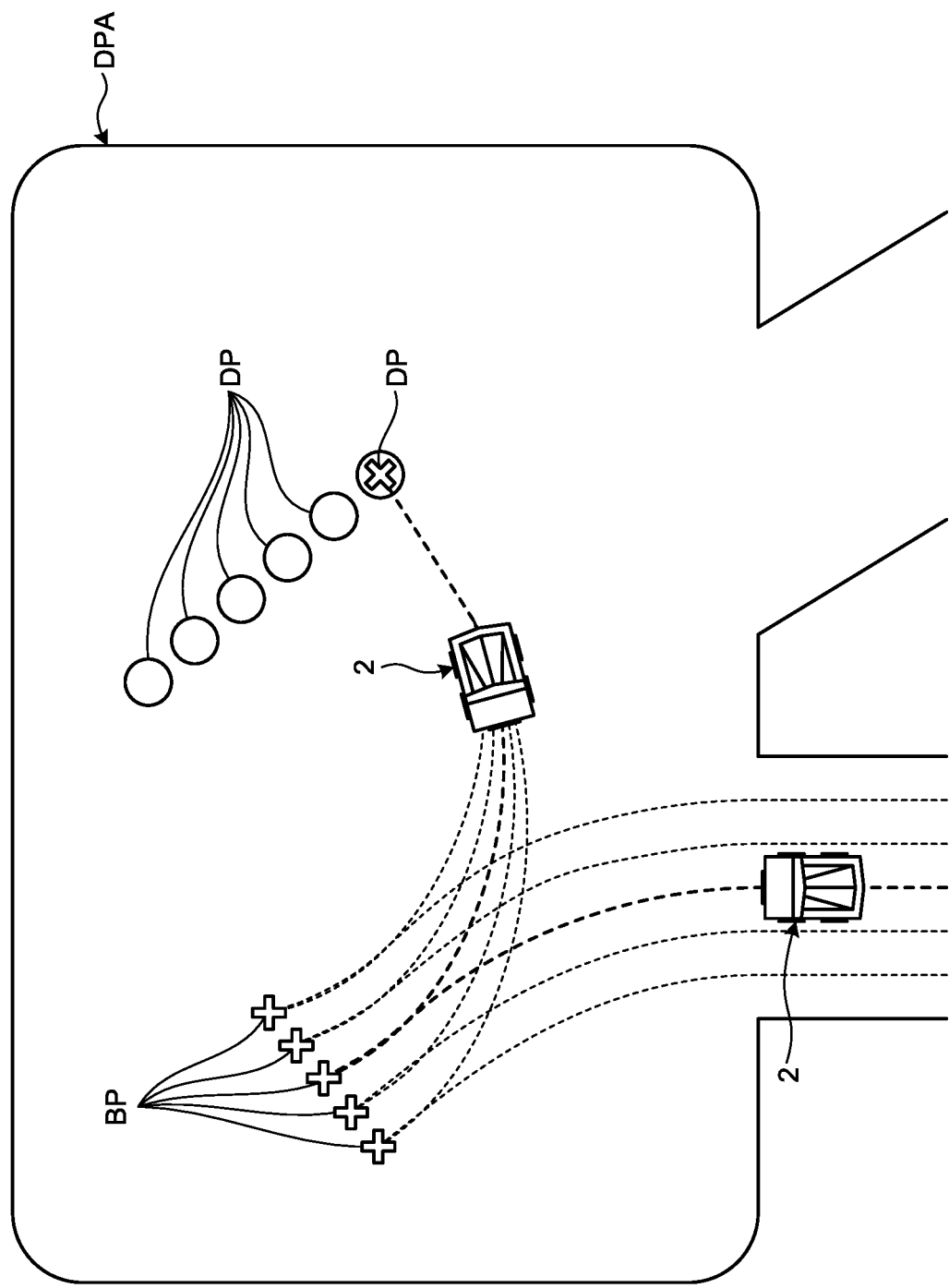
FIG. 17 is a schematic diagram illustrating an example of a dump truck control method according to an eighth embodiment.

FIG. 17 is a schematic diagram illustrating an example of a method of controlling the dump truck 2 according to the embodiment. As illustrated in FIG. 17, the switchback point setting unit 121 can set a plurality of switchback points BP of the dump truck 2 in the soil removing place DPA. Further, the work point setting unit 122 can set a plurality of discharging points DP of the dump truck 2 in the soil removing place DPA. The travel track generating unit 123 can generate the plurality of target travel tracks RP connecting each of the plurality of switchback points BP to the discharging point DP.

As described above, according to the embodiment, the generation of a rut in the soil removing place DPA is suppressed.

Additionally, the components setting the switchback point BP and the discharging point DP in the same soil removing place DPA of the embodiment can be appropriately combined with the components described in the above-described embodiments. For example, in the embodiment illustrated in FIG. 17, the number of switchback points BP may be one or the plurality of switchback points BP may be set in the specific area AR or along the specific line AL. Further, the dump truck 2 which enters any one of the plurality of discharging points DP from the switchback point BP may be set so that the positions of the plurality of discharging points DP are sequentially or randomly selected or are selected based on the frequency map.

Additionally, in the above-described embodiments, a case has been described in which the setting of the work point including one of or both the loading point LP and the discharging point DP is performed based on the operation of the input device 66 from the operator Ma. The work point may be automatically selected by the management apparatus 10. Further, the instruction data generated in the excavator 3 by the operation of the input device 66 through the operator Ma may be sent to the dump truck 2 through the vehicle-to-vehicle communication between the excavator 3 and the dump truck 2 without using the management apparatus 10.

Additionally, in the above-described embodiments, a case has been described in which the dump truck 2 is the unmanned dump truck. The dump truck 2 may be a manned dump truck which travels by the operation of the operator.

Additionally, in the above-described embodiments, a case has been described in which the control system 1 is applied to the traveling of the dump truck 2, but may be applied to, for example, the traveling of the other mining machine such as a wheel loader different from the dump truck 2.

Further, in the above-described embodiments, a case has been described in which the work machine is the mining machine operated in the mine, but the work machine may be used in a construction site different from the mine.

REFERENCE SIGNS LIST

1 CONTROL SYSTEM
2 DUMP TRUCK (MINING MACHINE)
3 EXCAVATOR (MINING MACHINE)
4 MINING MACHINE (WORK MACHINE)
5 POSITIONING SATELLITE
6 RELAY
7 CONTROL FACILITY
9 COMMUNICATION SYSTEM
10 MANAGEMENT APPARATUS
11 COMPUTER
12 PROCESSING DEVICE

13 STORAGE DEVICE
15 INPUT/OUTPUT UNIT
16 DISPLAY DEVICE
17 INPUT DEVICE
18 RADIO COMMUNICATION DEVICE
18A ANTENNA
21 TRAVELING DEVICE
22 VEHICLE BODY
23 VESSEL
24 DRIVING DEVICE
25 CONTROL DEVICE
26 VEHICLE WHEEL
27 AXLE
28 BRAKE DEVICE
29 STEERING DEVICE
35 POSITION DETECTOR
35A ANTENNA
36 RADIO COMMUNICATION DEVICE
36A ANTENNA
41 INPUT/OUTPUT UNIT
42 TRAVELING CONDITION DATA ACQUIRING UNIT
43 OPERATION CONTROL UNIT
44 ABSOLUTE POSITION DATA ACQUIRING UNIT
45 STORAGE UNIT
50 WORKING IMPLEMENT
53 BUCKET
57 DETECTING DEVICE
60 VEHICLE BODY
61 UPPER SWING BODY
62 LOWER TRAVEL BODY
62A DRIVE WHEEL
62B DRIVEN WHEEL
62C CRAWLER
63 CAB
64 DRIVER SEAT
65 OPERATION LEVER
66 INPUT DEVICE
67 DISPLAY DEVICE
68 POSITION DETECTOR
69 RADIO COMMUNICATION DEVICE
70 CONTROL DEVICE
71 INPUT/OUTPUT UNIT
72 BUCKET POSITION DATA ACQUIRING UNIT
73 INPUT DATA ACQUIRING UNIT
74 INSTRUCTION DATA GENERATING UNIT
121 SWITCHBACK POINT SETTING UNIT
122 WORK POINT SETTING UNIT
123 TRAVEL TRACK GENERATING UNIT
124 DATA ACQUIRING UNIT
125 TRAVEL TRACK SELECTING UNIT
126 TRAVEL CONTROL UNIT
AL SPECIFIC LINE
AR SPECIFIC AREA
AS PREDETERMINED AREA
BP SWITCHBACK POINT
DPA SOIL REMOVING PLACE
GR GRID
HL TRANSPORTATION TRACK
LP LOADING POINT (WORK POINT)
LPA LOADING PLACE
PI COURSE POINT
PA WORK PLACE
RP TARGET TRAVEL TRACK

The invention claimed is:

1. A work machine management method comprising:
setting a plurality of switchback points of a work machine for a single loading point in a work place of a mine;
setting at least one work point of the work machine in the work place;
generating a plurality of target travel tracks along which the work machine travels in the work place, each of the plurality of target travel tracks connecting a position of the at least one work point and a position of each of the plurality of switchback points; and
selecting, among the plurality of target travel tracks, a target travel track along which the work machine travels in the work place.

2. The work machine management method according to claim 1,
wherein the plurality of switchback points are set at intervals within a specific area inside the work place.

3. The work machine management method according to claim 1,
wherein the plurality of switchback points are set at intervals along a specific line inside the work place.

4. The work machine management method according to claim 1,
wherein the selecting includes selecting a first target travel track as a target travel track along which a first work machine travels in the work place and selecting a second target travel track different from the first target travel track as a target travel track along which a second work machine subsequently entering the work place travels in the work place.

5. The work machine management method according to claim 1,
wherein the selecting includes selecting the switchback point so that the work machine sequentially passes through the plurality of switchback points.

6. The work machine management method according to claim 1,
wherein the selecting includes randomly selecting, among the plurality of switchback points, the switchback point through which the work machine passes.

7. The work machine management method according to claim 1,
wherein the selecting includes selecting, among the plurality of switchback points, the switchback point through which the work machine passes so that a generation of a rut in the work place is suppressed by using a frequency map.

8. The work machine management method according to claim 1, further comprising:
setting a work point of the work machine in the work place,
wherein the setting of the work point includes setting a plurality of the work points, and
wherein the plurality of switchback points are respectively connected to the plurality of work points.

9. The work machine management method according to claim 1,
wherein the generating includes generating a target travel track of the work machine in a transportation track which is connected to the work place and along which the work machine entering the work place travels, and
wherein the target travel track in the transportation track is connected to each of the plurality of switchback points in the work place.

10. The work machine management method according to claim 9,
wherein the generating includes generating a plurality of the target travel tracks in the transportation track, and wherein the plurality of switchback points are respectively connected to the plurality of target travel tracks in the transportation track.

11. The work machine management method according to claim 1,
wherein the generating includes generating a plurality of target travel tracks of the work machine in a transportation track which is connected to the work place and along which the work machine leaving from the work place travels, and
wherein the work point is connected to each of the plurality of target travel tracks in the transportation track.

12. The work machine management method according to claim 11,
wherein the setting of the work point includes setting the plurality of work points, and
wherein the plurality of work points are respectively connected to the plurality of target travel tracks in the transportation track.

* * * * *